US010724661B2

(12) United States Patent
Ericksen et al.

(10) Patent No.: US 10,724,661 B2
(45) Date of Patent: Jul. 28, 2020

(54) CONDUIT COUPLING APPARATUS AND METHOD

(71) Applicant: Orbit Irrigation Products, LLC, North Salt Lake, UT (US)

(72) Inventors: Kent C. Ericksen, Centerville, UT (US); Eric Tres Wangsgaard, Salt Lake City, UT (US); Scot W. Hoskisson, Chesterfield, MI (US); Stuart J. Eyring, Bountiful, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 217 days.

(21) Appl. No.: 15/470,728

(22) Filed: Mar. 27, 2017

(65) Prior Publication Data

US 2017/0198842 A1    Jul. 13, 2017

Related U.S. Application Data

(63) Continuation of application No. 13/479,515, filed on May 24, 2012, now Pat. No. 9,604,404.
(Continued)

(51) Int. Cl.
*F16L 17/00* (2006.01)
*F16L 43/00* (2006.01)
(Continued)

(52) U.S. Cl.
CPC .......... *F16L 17/00* (2013.01); *B29C 65/0672* (2013.01); *B29C 66/534* (2013.01);
(Continued)

(58) Field of Classification Search
CPC ..... F16L 47/32; F16L 37/091; F16L 55/1157; F16L 37/0915; B29C 66/3022
See application file for complete search history.

(56) References Cited

U.S. PATENT DOCUMENTS 487,829 A    12/1892  England
991,501 A     5/1911  Graves
(Continued)

FOREIGN PATENT DOCUMENTS

CN    1942698    4/2007
EP    0226553    6/1987
(Continued)

OTHER PUBLICATIONS

Office Action, U.S. Appl. No. 13/911,068, dated Dec. 12, 2017 (shown in attachment 68).
(Continued)

*Primary Examiner* — David Bochna
*Assistant Examiner* — James A Linford
(74) *Attorney, Agent, or Firm* — Austin Rapp

(57) ABSTRACT

A coupling may be configured to receive and secure an insertion end of a conduit. An outer surface of the insertion end of the conduit may be smooth and free of grooves, flanges and beads. A first member of the coupling may define a first passageway. A second member of the coupling may define a second passageway. The first member may be in spin weld engagement with the second member. A gripping ring having an inner edge defining a series of teeth may be disposed within the second member. A support ring and O-ring may also be disposed within the second member.

20 Claims, 21 Drawing Sheets

Related U.S. Application Data

(60) Provisional application No. 61/489,624, filed on May 24, 2011.

(51) Int. Cl.

| | | |
|---|---|---|
| *B29C 65/06* | (2006.01) | |
| *B29C 65/00* | (2006.01) | |
| *F16L 47/32* | (2006.01) | |
| *F16L 55/115* | (2006.01) | |
| *F16L 37/091* | (2006.01) | |
| *F16L 37/00* | (2006.01) | |
| *F16L 41/02* | (2006.01) | |
| *H02G 3/06* | (2006.01) | |
| *B29C 65/08* | (2006.01) | |
| *B29C 65/48* | (2006.01) | |
| *B29C 65/82* | (2006.01) | |
| *B29C 65/02* | (2006.01) | |
| *B29C 65/56* | (2006.01) | |

(52) U.S. Cl.
CPC .......... *B29C 66/5344* (2013.01); *B29C 66/55* (2013.01); *B29C 66/612* (2013.01); *F16L 37/008* (2013.01); *F16L 37/0915* (2016.05); *F16L 41/021* (2013.01); *F16L 43/008* (2013.01); *F16L 47/32* (2013.01); *F16L 55/1157* (2013.01); *H02G 3/06* (2013.01); *B29C 65/02* (2013.01); *B29C 65/08* (2013.01); *B29C 65/48* (2013.01); *B29C 65/561* (2013.01); *B29C 65/8246* (2013.01); *B29C 66/3022* (2013.01); *B29C 66/30341* (2013.01); *B29C 66/52231* (2013.01); *B29C 66/52241* (2013.01); *B29C 66/71* (2013.01); *F16L 2201/80* (2013.01)

(56) References Cited

U.S. PATENT DOCUMENTS

| | | |
|---|---|---|
| 2,514,717 A | 7/1950 | Power |
| 3,051,514 A | 8/1962 | Consolloy |
| 3,155,402 A | 11/1964 | Cornelius |
| 3,312,483 A | 4/1967 | Leadbetter et al. |
| 3,633,944 A | 1/1972 | Hamburg |
| 3,837,687 A | 9/1974 | Leonard |
| 3,976,314 A | 8/1976 | Graham |
| 4,005,883 A | 2/1977 | Guest |
| 4,047,739 A | 9/1977 | Aitken |
| 4,123,090 A | 10/1978 | Kotsakis et al. |
| 4,266,814 A | 5/1981 | Gallagher |
| 4,288,113 A | 9/1981 | Saulnier |
| 4,440,424 A | 4/1984 | Mode |
| 4,573,716 A | 3/1986 | Guest |
| 4,593,943 A | 6/1986 | Hama et al. |
| 4,606,783 A | 8/1986 | Guest |
| 4,630,848 A | 12/1986 | Twist et al. |
| 4,657,286 A | 4/1987 | Guest |
| 4,712,810 A | 12/1987 | Pozzi |
| 4,722,558 A | 2/1988 | Badoureaux |
| 4,747,626 A | 5/1988 | Hama et al. |
| 4,777,669 A | 10/1988 | Rogus |
| 4,804,213 A | 2/1989 | Guest |
| 4,834,423 A | 5/1989 | DeLand |
| 4,895,395 A | 1/1990 | Ceriani |
| 4,919,457 A | 4/1990 | Moretti |
| 4,925,217 A | 5/1990 | Ketcham |
| 4,946,213 A | 8/1990 | Guest |
| 4,951,975 A | 8/1990 | Bartholomew |
| 5,005,877 A | 4/1991 | Hayman |
| 5,069,424 A | 12/1991 | Dennany, Jr. et al. |
| 5,105,854 A | 4/1992 | Cole et al. |
| 5,135,268 A | 8/1992 | McNaughton et al. |
| 5,152,555 A | 10/1992 | Szabo |
| 5,160,179 A | 11/1992 | Takagi |
| 5,171,045 A | 12/1992 | Pasbrig |
| 5,178,424 A | 1/1993 | Klinger |
| 5,219,188 A | 6/1993 | Abe et al. |
| 5,230,539 A | 7/1993 | Olson |
| 5,292,157 A | 3/1994 | Rubichon |
| 5,328,215 A | 7/1994 | Grenier |
| 5,366,262 A | 11/1994 | Couvreur |
| 5,378,025 A | 1/1995 | Szabo |
| 5,401,064 A | 3/1995 | Guest |
| 5,415,825 A | 5/1995 | Sellers |
| 5,437,483 A | 8/1995 | Umezawa |
| 5,464,228 A | 11/1995 | Weber et al. |
| 5,487,572 A | 1/1996 | Combot-Courrau et al. |
| 5,496,073 A | 3/1996 | Grenier |
| 5,518,276 A | 5/1996 | Gunderson |
| 5,533,761 A | 7/1996 | Ostrander |
| 5,551,732 A | 9/1996 | Bartholomew |
| 5,551,735 A | 9/1996 | Takayanagi et al. |
| 5,553,895 A | 9/1996 | Karl |
| 5,655,796 A | 8/1997 | Bartholomew |
| 5,692,784 A | 12/1997 | Hama et al. |
| 5,695,224 A | 12/1997 | Grenier |
| 5,722,696 A | 3/1998 | Taneya |
| 5,727,821 A | 3/1998 | Miller |
| 5,775,738 A | 7/1998 | Bartholomew |
| 5,794,984 A | 8/1998 | Bartholomew |
| 5,911,443 A | 6/1999 | Le Quere |
| 5,934,709 A | 8/1999 | Morrison |
| 5,943,709 A | 8/1999 | Chiu |
| 5,989,240 A | 11/1999 | Strowe |
| 6,010,160 A | 1/2000 | Bartholomew |
| 6,062,607 A | 5/2000 | Bartholomew |
| 6,142,538 A | 11/2000 | Volgstadt et al. |
| 6,145,887 A | 11/2000 | Combot-Courrau et al. |
| 6,170,886 B1 | 1/2001 | Bartholomew |
| 6,174,002 B1 | 1/2001 | Rho |
| 6,183,020 B1 | 2/2001 | Luft |
| 6,183,022 B1 | 2/2001 | Guest |
| 6,312,020 B1 | 11/2001 | Ketcham et al. |
| 6,464,266 B1 | 10/2002 | O'Neill et al. |
| 6,550,815 B2 | 4/2003 | Zitkowic, Jr. et al. |
| 6,557,899 B2 | 5/2003 | Martin-Cocher et al. |
| 6,749,231 B2 | 6/2004 | LeMay et al. |
| 7,021,672 B2 | 4/2006 | Ericksen et al. |
| 7,195,287 B2 | 3/2007 | Wai |
| 7,445,247 B2 | 11/2008 | Ericksen et al. |
| 7,810,850 B2 | 10/2010 | O'Neill et al. |
| 7,942,161 B2 | 5/2011 | Crompton |
| D732,359 S | 6/2015 | Ericksen et al. |
| 9,429,262 B2 | 8/2016 | Ericksen et al. |
| D776,998 S | 1/2017 | Ericksen et al. |
| 9,604,404 B2 | 3/2017 | Ericksen et al. |
| D811,182 S | 2/2018 | Ericksen |
| 2004/0240940 A1 | 12/2004 | Ericksen et al. |
| 2005/0206160 A1 | 9/2005 | Ericksen et al. |
| 2006/0108802 A1 | 5/2006 | Baumgartner |
| 2007/0138791 A1 | 6/2007 | Greenberger |
| 2007/0241562 A1 | 10/2007 | O'Neill et al. |
| 2009/0160178 A1 | 6/2009 | Ericksen et al. |
| 2009/0160179 A1 | 6/2009 | Ericksen et al. |
| 2010/0066075 A1 | 3/2010 | Crompton |
| 2010/0314863 A1 | 12/2010 | Ohara et al. |
| 2011/0304137 A1 | 12/2011 | Ericksen et al. |

FOREIGN PATENT DOCUMENTS

| | | |
|---|---|---|
| EP | 0240452 | 7/1987 |
| EP | 0255368 | 2/1988 |
| EP | 0738851 | 10/1996 |
| EP | 0745801 | 12/1996 |
| EP | 1521027 | 4/2005 |
| FR | 1382077 | 12/1964 |
| FR | 2871216 | 12/2005 |
| GB | 916070 | 1/1963 |
| GB | 2109885 | 6/1983 |
| GB | 2155576 | 9/1985 |
| WO | 2004106794 A2 | 12/2004 |
| WO | 2012162554 A1 | 11/2012 |

(56) References Cited

FOREIGN PATENT DOCUMENTS

OTHER PUBLICATIONS

Issue Fee Payment, U.S. Appl. No. 29/591,859, dated Jan. 3, 2018 (shown in attachment 69).
Office Action Response, U.S. Appl. No. 13/911,068, dated Aug. 31, 2017 (shown in attachment 64).
Applicant-Initiated Interview Summary, U.S. Appl. No. 13/911,068, dated Nov. 1, 2017 shown in attachment 65).
Office Action Response, U.S. Appl. No. 29/591,859, dated Sep. 11, 2017 (shown in attachment 36).
Notice of Allowance and Fee(s) Due (including a Notice of Allowability for a Design Application section, and an Examiner's Amendment/Comment section), U.S. Appl. No. 29/591,859, dated Oct. 5, 2017 (shown in attachment 67).
U.S. Appl. No. 29/591,859, filed Jan. 24, 2017, Kent C. Ericksen et al.
U.S. Appl. No. 13/911,068, filed Jun. 5, 2013, Kent C. Ericksen et al.
Office Action, U.S. Appl. No. 10/678,013, dated Sep. 17, 2004 (shown in attachment 1).
Office Action Response, U.S. Appl. No. 10/678,013, dated Nov. 5, 2004 (shown in attachment 2).
Office Action, U.S. Appl. No. 10/678,013, dated Feb. 9, 2005 (shown in attachment 3).
Office Action Response, U.S. Appl. No. 10/678,013, dated Apr. 4, 2005 (shown in attachment 4).
Office Action, U.S. Appl. No. 10/678,013, dated May 26, 2005 (shown in attachment 5).
Office Action Response, U.S. Appl. No. 10/678,013, dated Aug. 8, 2005 (shown in attachment 6).
Notice of Allowance and Fee(s) Due (including a Notice of Allowability section) U.S. Appl. No. 10/678,013, dated Jan. 10, 2006 (shown in attachment 7).
Issue Fee Transmittal, U.S. Appl. No. 10/678,013, dated Jan. 30, 2006 (shown in attachment 8).
Office Action, U.S. Appl. No. 11/124,217, dated Jul. 10, 2007 (shown in attachment 9).
Office Action Response, U.S. Appl. No. 11/124,217 (Including an Exhibit 1, and an Exhibit 2) dated Nov. 12, 2007 (shown in attachment 10).
Office Action, U.S. Appl. No. 11/124,217, dated Feb. 11, 2008 (shown in attachment 11).
Office Action Response, U.S. Appl. No. 11/124,217, dated Mar. 6, 2008 (shown in attachment 12).
Interview Summary, U.S. Appl. No. 11/124,217, dated Oct. 23, 2007 (shown in attachment 13).
Notice of Allowance and Fee(s) Due (including a Notice of Allowability section, a Continued Examination section, and an Examiner's Amendment section) U.S. Appl. No. 11/124,217, dated Sep. 5, 2008 (shown in attachment 14).
Issue Fee Transmittal, U.S. Appl. No. 11/124,217, dated Sep. 30, 2008 (shown in attachment 15).
Examiner-Initiated Interview Summary, U.S. Appl. No. 11/124,217, dated Aug. 18, 2008 (shown in attachment 16).
Notice of Allowance and Fee(s) Due (including a Notice of Allowability for a Design Application section, an Examiner's Comment section, a Continuing Prosecution Application section and a General Information section), U.S. Appl. No. 29/430,121, dated Feb. 17, 2015 (shown in attachment 17).
Office Action, U.S. Appl. No. 12/263,602, dated Jul. 19, 2010 (shown in attachment 18).
Office Action, U.S. Appl. No. 12/263,567, dated Aug. 3, 2011 (shown in attachment 19).
International Search Report for PCT Application No. PCT/US2003/034542, dated Sep. 21, 2006 (shown in attachment 20).
Supplemental European Search Report for European Patent Application No. EP 03 78 1541, dated Feb. 15, 2010 (shown in attachment 21).
Office Action for European Patent Application No. EP 03 78 1541, dated Apr. 26, 2011 (shown in attachment 22).
European Search Report for European App. No. EP 87 63 0045, Search Completed on Jul. 8, 1987 (shown in attachment 23).
Continued Prosecution Application (including a Preliminary Amendment), U.S. Appl. No. 29/430,121, dated Oct. 29, 2014 (shown in attachment 24).
Notification of Transmittal of the International Search Report and the Written Opinion of the International Searching Authority, or the Declaration, International Patent PCT App. No. PCT/US2012/039457, dated Aug. 31, 2012 (shown in attachment 25).
International Search Report, International Patent PCT App. No. PCT/US2012/039457, dated Aug. 31, 2012 (shown in attachment 26).
Written Opinion of the International Searching Authority, International Patent PCT App. No. PCT/US2012/039457, dated Aug. 31, 2012 (shown in attachment 27).
Nibco Inc., Slip Fix with Truconnect, a product sheet [trade show], Distributed on or before Nov. 16, 2003 (shown in attachment 28).
Nibco Inc., Ahead of the Flow, Truconnect, web page [online]. [retrieved on Nov. 21, 2011], Published on or before Nov. 21, 2003, Retrieved from the Internet: <URL: http://www.nibco.com/newproducts/TruConnect.shtml> (shown in attachment 29).
Cash Acme, SharkBite Water Heater Installation Kit, Installation Guide [online]. [retrieved on Nov. 21, 2011], Published at least by Aug. 2004, Retrieved from the Internet: <URL: https://web.archive.org/web/20040807224113/http://www.cashacme.com/pdf_sharkbite/sales/CAC04054_SharkBite_WH_Kit_Sales.pdf> (shown in attachment 30).
Cash Acme, SharkBite Push-Fit Fittings, web page [online]. [retrieved on Sep. 19, 2012], Published at least by Aug. 12, 2004, Retrieved from the Internet: <URL: https://web.archive.org/web/20040807174201/http://www.cashacme.com/sharkbitewaterheater.html> (shown in attachment 31)
Cash Acme, SharkBite Push-Fit Fittings, Installation Guide [online]. [retrieved on Nov. 21, 2011], Published at least by May 2009, Retrieved from the Internet <URL: https://web.archive.org/web/20040807224113/http://www.cashacme.com/pdf_sharkbite/sales/HB001_SharkBite_PF_Kit_Sales.pdf> (shown in attachment 32).
Office Action, U.S. Appl. No. 13/216,101, dated Jul. 22, 2014 (shown in attachment 33).
Office Action Response, U.S. Appl. No. 13/216,101, dated Dec. 22, 2014 (shown in attachment 34).
Office Action, U.S. Appl. No. 13/216,101, dated Apr. 24, 2015 (shown in attachment 35).
Office Action Response, U.S. Appl. No. 13/216,101, dated Sep. 24, 2015 (shown in attachment 36).
Request for Continued Examination, U.S. Appl. No. 13/216,101, dated Oct. 23, 2015 (shown in attachment 37).
Preliminary Amendment, U.S. Appl. No. 13/216,101, dated Mar. 30, 2016 (shown in attachment 38).
Notice of Allowance and Fee(s) Due (including a Notice of Allowability section, an Information Disclosure Statement section, a Drawings section and a Reasons for Allowance section), U.S. Appl. No. 13/216,101, dated April 11, 2016 (shown in attachment 39).
Restriction Requirement, U.S. Appl. No. 13/911,068, dated May 21, 2015 (shown in attachment 40).
Restriction Requirement Response, U.S. Appl. No. 13/911,068, dated Jul. 15, 2015 (shown in attachment 41).
Office Action, U.S. Appl. No. 13/911,068, dated Oct. 26, 2015 (shown in attachment 42).
Office Action Response, U.S. Appl. No. 13/911,068, dated Dec. 30, 2016 (shown in attachment 43).
Request for Continued Examination, U.S. Appl. No. 13/911,068, dated Dec. 30, 2016 (shown in attachment 44).
Office Action Response, U.S. Appl. No. 13/911,068, dated Mar. 28, 2016 (shown in attachment 45).
Restriction Requirement, U.S. Appl. No. 13/479,515, dated Mar. 19, 2015 (shown in attachment 46).
Restriction Requirement Response, U.S. Appl. No. 13/479,515, dated Jun. 18, 2015 (shown in attachment 47).
Office Action, U.S. Appl. No. 13/479,515, dated Aug. 20, 2015 (shown in attachment 48).

(56) References Cited

OTHER PUBLICATIONS

Office Action Response, U.S. Appl. No. 13/479,515, dated Jan. 20, 2016 (shown in attachment 49).
Supplemental Amendment, U.S. Appl. No. 13/479,515, dated Jun. 10, 2016 (shown in attachment 50).
Notice of Allowance and Fee(s) Due (including a Notice of Allowability section, and a Reasons for Allowance section), U.S. Appl. No. 13/479,515, dated Jun. 30, 2016 (shown in attachment 51).
Examiner Interview Summary, U.S. Appl. No. 13/479,515, dated Jun. 10, 2016 (shown in attachment 52).
Notice of Allowance and Fee(s) Due (including a Notice of Allowability section, an Examiner's Amendment section, a Claims section, a Reasons for Allowance section, and an Information Disclosure Statement section), U.S. Appl. No. 13/479,515, dated Nov. 8, 2016 (shown in attachment 53).
Issue Fee Transmittal, U.S. Appl. No. 13/479,515, dated Feb. 8, 2017 (shown in attachment 54).
Issue Fee Transmittal, U.S. Appl. No. 13/216,101, dated Jul. 11, 2016 (shown in attachment 55).
Notice of Allowance and Fee(s) Due (including a Notice of Allowability For a Design Application section, a General Information section, an Election of Group section, and Information Disclosure Statement section, an Examiner's Amendment section, Drawings section, a Corrected the Drawings Required section, and a Specification section), U.S. Appl. No. 29/430,121, dated Jul. 29, 2014 (shown in attachment 56).
Issue Fee Transmittal, U.S. Appl. No. 29/430,121, dated May 13, 2015 (shown in attachment 57).
Notice of Allowance and Fee(s) Due (including a Notice of Allowability for a Design Application section, an Examiner's Amendment/Comment section, a Preliminary Amendment section, an Incorporation by Reference section, and a Restriction Not Required Section), U.S. Appl. No. 29/530,873, dated Sep. 12, 2016 (shown in attachment 58).
Issue Fee Transmittal, U.S. Appl. No. 29/530,873, dated Dec. 12, 2016 (shown in attachment 59).
Office Action, U.S. Appl. No. 29/591,859, dated Mar. 10, 2017 (shown in attachment 60).
Office Action, U.S. Appl. No. 13/911,068, dated Mar. 31, 2017 (shown in attachment 61).
Supplemental Office Action Response, U.S. Appl. No. 13/911,068, dated Mar. 15, 2017 (shown in attachment 62).
Office Action, U.S. Appl. No. 13/911,068, dated Jun. 30, 2016 (shown in attachment 63).

| Burst Data for Sonic Weld ||
|---|---|
| Item | Burst Pressure (PSI) |
| 1 | 430 |
| 2 | 380 |
| 3 | 650 |
| 4 | 450 |
| 5 | 660 |
| 6 | 720 |
| 7 | 575 |
| 8 | 502 |
| 9 | 482 |
| 10 | 630 |
| AVERAGE | 547.9 |

*FIG. 22*

| Burst Data for Spin Weld ||
|---|---|
| Item | Burst Pressure (PSI) |
| 1 | 931 |
| 2 | 925 |
| 3 | 868 |
| 4 | 892 |
| 5 | 967 |
| 6 | 862 |
| 7 | 884 |
| 8 | 811 |
| 9 | 920 |
| 10 | 720 |
| 11 | 864 |
| 12 | 1001 |
| 13 | 930 |
| 14 | 880 |
| 15 | 1005 |
| Average | 897.3 |

*FIG. 23*

CONDUIT COUPLING APPARATUS AND METHOD

RELATED APPLICATIONS

This application claims priority to and is a continuation application of U.S. patent application Ser. No. 13/479,515 filed on May 24, 2012 and entitled Conduit Coupling Apparatus and Method, which is a non-provisional application and claims priority to U.S. Provisional Patent App. Ser. No. 61/489,624 that was filed on May 24, 2011, entitled CONDUIT COUPLING APPARATUS AND METHOD. The foregoing applications are incorporated herein by this reference.

TECHNICAL FIELD

The disclosed subject matter relates to couplings for fluid systems. More specifically, the disclosed subject matter relates to couplings that may be used to easily retain or release flexible plastic or rigid tubing or pipes such as are typically used in irrigation systems.

BACKGROUND

Many types of systems have components between which fluid is conveyed through conduits. Such fluid systems include irrigation systems, household plumbing, air conditioning systems, heater humidifiers, misting systems, and garden hoses. Typically, the conduits of the fluid system must be coupled to components in such a manner that a fluid-tight seal is maintained. Thus, the process of connecting the conduits to their respective components can be somewhat time-consuming.

For example, in a standard residential irrigation system, lengths of polyvinyl chloride (PVC) pipe are typically buried to act as conduits. The lengths of pipe must be attached to components of the system such as manifolds, electric valves, stop and waste valves, backflow prevention devices, sprinkler heads, and drip irrigation tubes. In some cases, other conduits such as conduit (e.g., "flexi-pipe") may be used to couple a PVC pipe to an irrigation component.

More precisely, the lengths of PVC pipe or conduit must often be attached to each other or to irrigation components via application of primer and plastic cement. Such a process is somewhat time consuming and messy, and provides a relatively unreliable connection. To the extent that threaded or barbed fittings can be used, a connection may be formed more rapidly than with primer and glue, but the integrity of the connection is still uncertain.

Various types of couplings are available to attach irrigation components, PVC pipe, and/or flexible tubing together. However, known couplings have a number of inherent disadvantages. Often, such couplings require primer and glue, threaded attachment, or barbed attachment, and therefore add significantly to the required installation time.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

A coupling for attachment to a conduit having an insertion end is disclosed. An outer surface of the insertion end of the conduit may be smooth and free of grooves, flanges and beads.

The coupling may include a first member having an exterior surface and an interior surface. The interior surface of the first member may define a first passageway through the first member. The first passageway may extend from an entry end to a proximal end of the first member.

The coupling may also include a second member in spin weld engagement with the first member. The second member may have an exterior surface and an interior surface. The interior surface of the second member may define a second passageway through the second member. The second passageway may extend from an attachment end to an opposite end of the second member. The interior surface of the second member may define a first recessed region having a first region width and a second recessed region having a second region width. In one embodiment, the first region width is greater than the second region width.

In one configuration, the interior surface of the second member defining the second recessed region may comprise a ledge. The ledge may comprise a raised inner lip and a recessed outer portion. The raised inner lip may be closer to the attachment end of the second member than the recessed outer portion.

The coupling may comprise a gripping ring having an inner edge defining a series of teeth. The gripping ring may be disposed within the first recessed region.

One embodiment of the coupling may also comprise a support ring. The support ring may be rotatably disposed within the first and second recessed regions of the second member. The support ring may have a proximal face that abuts the gripping ring. The support ring may further comprise an angled face adjacent to the proximal face. The angled face may be disposed at an obtuse angle with respect to the proximal face.

The coupling may further comprise an O-ring disposed within the second recessed region. The recessed outer portion may be sized to receive the O-ring.

The interior surface of the second member may further define a third recessed region having a third region width. The third region width may be greater than the first region width. The first recessed region may be disposed intermediate the third recessed region and the second recessed region. In one embodiment, at least a portion of the first member is disposed within the third recessed region.

The gripping ring may comprise an outer body having a body width. The proximal face of the support ring may further comprise a face width. The face width may be less than the body width. In another embodiment, the face width is less than one-half, one-quarter, or one-eighth of the body width.

The exterior surface of the first member may comprise an outer perimeter surface that abuts the interior surface of the second member. The exterior surface of the first member may further comprise a beveled edge adjacent to the outer perimeter surface. The beveled edge may extend away from the interior surface of the second member. The beveled edge may be disposed within the first recessed region of the second member.

The support ring may also comprise an inward ledged recess sized to mate with a ledge defined by the interior surface of the second member.

Another embodiment of a coupling for attachment to a conduit is disclosed. Again, the conduit may have an insertion end. The outer surface of the insertion end of the conduit may be smooth and free of grooves, flanges and beads.

The coupling may include a first member having an exterior surface and an interior surface. The interior surface of the first member may define a first passageway through the first member. The first passageway may extend from an entry end to a proximal end of the first member.

The coupling may further comprise a second member in spin weld engagement with the first member. The second member may have an exterior surface and an interior surface. The interior surface of the second member may define a second passageway through the second member. The second passageway may extend from an attachment end to an opposite end of the second member. The interior surface of the second member may define a first recessed region having a first region width, and a second recessed region having a second region width. The first region width may be greater than the second region width.

The coupling may further comprise a gripping ring having an inner edge defining a series of teeth. The gripping ring may be disposed within the first recessed region.

The coupling may also comprise a support ring disposed within the first and second recessed regions. The support ring may have a proximal face that abuts or is proximate the gripping ring.

The coupling may also comprise an O-ring disposed within the second recessed region.

In one embodiment, the interior surface of the first member may define a plurality of tool receiving recesses.

The gripping ring may comprise an outer body having a body width. The proximal face of the support ring may further comprise a face width. In various embodiments, the face width may be less than one-half, one-quarter, or one-eighth of the body width.

The exterior surface of the first member may comprise an outer perimeter surface that abuts the interior surface of the second member. The exterior surface of the first member may further comprise a beveled edge adjacent to the outer perimeter surface. The beveled edge may extend inwardly away from the interior surface of the second member.

The support ring may comprise an inward ledged recess sized to mate with a ledge defined by the interior surface of the second member.

A method of manufacturing a coupling is also disclosed. The method may comprise the following steps:

positioning an O-ring within a second recessed region of the second member;

positioning a support ring within a second recessed region of the second member adjacent to the O-ring;

positioning a gripping ring adjacent to the support ring such that the outer body of the gripping ring abuts a proximal face of the support ring; and securing a first member to a second member utilizing a spin welding technique to form the spin weld engagement such that the first member securely retains the O-ring, the support ring, and the gripping ring within the second member.

Such a method may further comprise the following step:

positioning at least a portion of the first member within a third recessed region and the first recessed region defined by the second member while the first member is secured to the second member utilizing the spin welding technique.

In such a method, the interior surface of the second member may define the third recessed region. The third recessed region may have a third region width. The third region width may be greater than the first region width, and the first recessed region may be disposed intermediate the third recessed region and the second recessed region.

Another method of manufacturing the coupling is also disclosed. This method may include the following steps:

positioning an O-ring within a second recessed region of a second member;

positioning a support ring within at least a first recessed region of the second member;

positioning a gripping ring adjacent to the support ring such that an outer body of the gripping ring abuts a proximal face of the support ring; and securing the first member to the second member utilizing a spin welding technique to form the spin weld engagement such that the first member securely retains the O-ring, the support ring, and the gripping ring within the second member.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

BRIEF DESCRIPTION OF THE DRAWINGS

Exemplary embodiments of the disclosed subject matter will become more fully apparent from the following description and appended claims, taken in conjunction with the accompanying drawings. Understanding that these drawings depict only exemplary embodiments and are, therefore, not to be considered limiting of the disclosed subject matter's scope, the exemplary embodiments of the disclosed subject matter will be described with additional specificity and detail through use of the accompanying drawings in which:

FIG. 22 comprises a table illustrating burst or failure pressures for a coupling formed using sonic welding; and FIG. 23 comprises a table illustrating burst or failure pressures for a coupling formed using spin welding.

Figure 1:
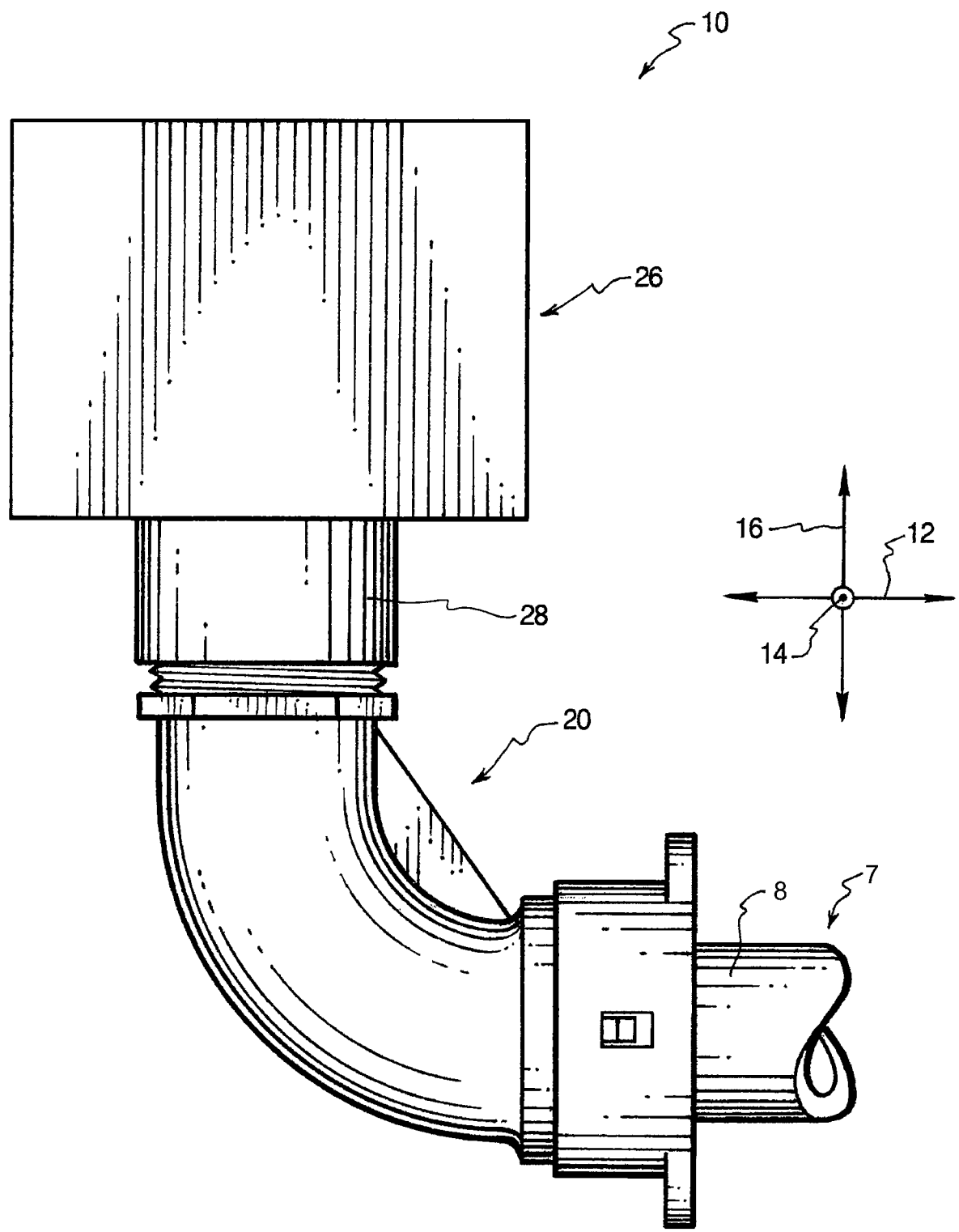
FIG. 1 is a side elevation view of a portion of a generalized fluid system having a component and a conduit interconnected by a first embodiment of a coupling incorporating teachings of the disclosed subject matter.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may (but not in all cases) be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The presently preferred embodiments of the disclosed subject matter will be best understood by reference to the drawings, wherein like parts may (but not in all cases) be designated by like numerals. It will be readily understood that the components of the disclosed subject matter, as generally described and illustrated in the figures herein, could be arranged and designed in a wide variety of different configurations. Thus, the following more detailed description of the embodiments of the apparatus, system, and method of the disclosed subject matter, as represented in the accompanying figures, is not intended to limit the scope of the disclosed subject matter, as claimed, but is merely representative of presently preferred embodiments of the disclosed subject matter.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abut" refers to items that are in direct physical contact with each other, although the items may be attached, secured, fused, or welded together. The terms "integrally formed" refer to a body that is manufactured integrally, i.e., as a single piece, without requiring the assembly of multiple pieces. Multiple parts may be integrally formed with each other if they are formed from a single workpiece.

Referring to FIG. 1, a side elevation view illustrates a portion of a generalized fluid system 10 according to one embodiment of the disclosed subject matter. A "fluid system" refers to any type of system that contains and/or moves fluid (including liquids, gases, and liquid/gas mixtures) through any type of conduit. The fluid system 10 may be of a wide variety of types, including but not limited to, irrigation systems, heater humidification systems, air conditioning systems, evaporative cooling systems, misting systems for outdoor comfort, and the like. For convenience in this discussion, the fluid system 10 is assumed to be an irrigation system for distributing water onto soil.

Figure 2:
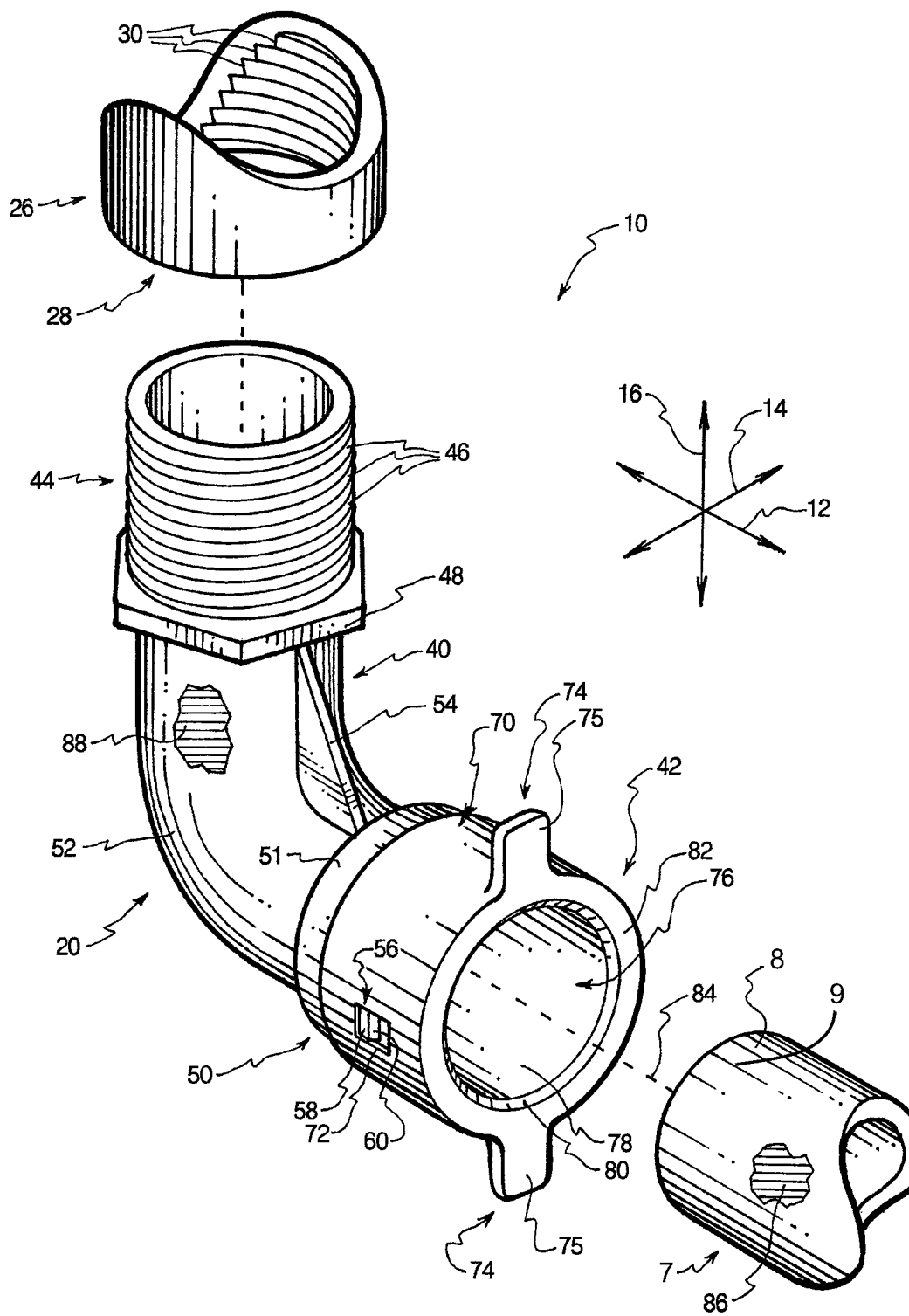
FIG. 2 is an exploded perspective view of the fluid system of FIG. 1.

The fluid system 10 has a longitudinal direction 12, a lateral direction 14, and a transverse direction 16. As shown, the fluid system 10 includes a coupling 20, which is designed to be attached to a length of conduit 7. The conduit 7 may include any of a variety of conduit types, including metal tubing, PVC pipe, or plastic "flexi-pipe" of a type commonly used in residential sprinkler systems. The conduit 7 has an insertion end 8, designed to be captured by the coupling 20. As illustrated in FIG. 2, the outer surface 9 of the insertion end 8 of the conduit 7 is smooth and is free of grooves, flanges, and beads.

The coupling 20 provides fluid communication between the conduit 7 and a component 26, which may be any of a variety of fluid implements. "Fluid communication" refers to the existence of a generally enclosed fluid flow pathway between two articles. In the fluid system 10 of FIG. 1, the component 26 is designed for irrigation, and may thus include implements such as sprinkler heads, perforated water distribution tubes, electrically operated valves, stop and waste valves, backflow preventers, sprinkler risers, spray nozzles, garden hoses, and conduits. Since the disclosed subject matter includes a wide variety of fluid systems aside from irrigation systems, the term "component" contemplates the use of a wide variety of other types of fluid implements.

A "spray nozzle" may be any of a variety of nozzles such as hand sprayers for irrigation or household cleaning, misting nozzles designed to provide a comfortable mist in warm weather, internal furnace humidifier nozzles, and the like. A "perforated water distribution tube" may include drip irrigation lines, water distribution lines for evaporative coolers, and the like. A "valve" includes many different types of valves, including check valves, electrically operated valves, manually operated valves, and the like. A stop and waste valve for irrigation systems is included within the term "valve."

In one embodiment, the component 26 is a sprinkler designed to be seated in the ground in a vertical orientation and fed by fluid flowing generally horizontally through the conduit 7. Thus, the coupling 20 is shaped to form a ninety-degree angle. The coupling 20 may thus be termed an "elbow fitting." In other embodiments, similar couplings could be made straight, U-shaped, or with any other desirable angle. The component 26 has a fitting such as a threaded end 28 designed to engage the coupling 20. A "fitting" need not be a separate fastening device, but may simply be an attachment interface integrally formed with a component.

Referring to FIG. 2, an exploded, perspective view illustrates a portion of the fluid system 10 of FIG. 1 in greater detail. As shown, the threaded end 28 of the component 26 has been cut away to reveal that the threaded end 28 has threads disposed on an inside diameter thereof. The threads 30 thus act as female threads to attach the coupling 20 to the component 26. Of course, in an alternative embodiment, the component 26 could have male threads and the coupling 20 could have female threads.

In the embodiment shown, the coupling 20 has a body 40 and a release mechanism 42 that is slidable with respect to the body 40 along the longitudinal direction 12. "Slidable" refers to the ability for two objects to move relative to and in contact with each other. "Sliding" encompasses linear motion, rotary motion, and combinations thereof. In the embodiment shown, the release mechanism 42 is generally ring-shaped, and may thus be termed a release ring 42. The body 40 has a first end 44 designed to be connected to the threaded end 28 of the component 26. The first end 44 thus has threads 46 sized to mate with the threads 30 of the threaded end 28. Additionally, the first end 44 may have a hexagonal lip 48 that facilitates rotational coupling and tightening of the first end 44 with the threaded end 28 of the component 26.

In alternative embodiments, a wide variety of fitting types may be used in place of the threads 30 of the first end 44. For example, a female threaded fitting, quick-connect coupling, swage lock, snap-in fitting, or the like may be used to connect to a wide variety of corresponding fittings.

The body 40 also has a second end 50 in which a shoulder 51 is formed. The shoulder 51 is generally tubular in shape. The second end 50 and the first end 44 are separated by a bend 52 that provides the ninety-degree angle. The bend 52 is structurally supported by a gusset 54 that extends generally from the first end 44 to the second end 50.

The second end 50 has a pair of retention features 56 displaced from each other in the lateral direction 14, and thus positioned on opposite sides of the shoulder 51. The retention features 56 are designed to slidably retain the release ring 42. Each retention feature 56 has a plateau 58 that limits relative motion between the release ring 42 and the body 40, and a ramp 60 adjoining the plateau 58 to facilitate assembly of the release ring 42 and the body 40.

The release ring 42 has an exterior sleeve 70. The exterior sleeve 70 is sized just larger than the shoulder 51 so that the exterior sleeve 70 is able to act as a dirt shield, thereby preventing entry of dirt or other particles into the space between the release ring 42 and the second end 50. The exterior sleeve 70 extends a sufficient distance in the longitudinal direction 12 to provide a relatively snug fit between the release ring 42 and the second end 50 and to enhance protection from contamination. The operation of the exterior sleeve 70 as a dirt shield will be discussed in greater detail subsequently. The dimensions of the exterior sleeve 70 also facilitate longitudinal motion of the release ring 42 with respect to the body 40 by maintaining the concentricity of the release ring 42 with the second end 50.

A pair of retention slots 72 is formed in the exterior sleeve 70 and positioned such that the retention features 56 extend into the retention slots 72. Each of the retention slots 72 is generally rectangular in shape, and is slightly longer in the longitudinal direction 12 than the combined longitudinal dimensions of the plateau 58 and the ramp 60 of the corresponding retention feature 56. Thus, the exterior sleeve 70 is able to move a limited distance in the longitudinal direction 12 with respect to the second end 50 of the body 40.

Disposition of the retention slots 72 and the retention features 56 on the outside of the coupling 20 is advantageous because they are relatively easy to manufacture and manipulate, and they do not interfere with insertion of the conduit 7 into the coupling 20. The retention slots 72 and the retention features 56 also operate in such a manner that no rotation of the release ring 42 is required to move between engaged and disengaged configurations. In alternative embodiments, a release mechanism may be rotatable or translatable and rotatable.

When the release ring 42 is extended from the second end 50, to the furthest extent permitted by the interlocking of the retention features 56 with the retention slots 72, the coupling 20 is in the engaged configuration, in which the end 8 of the conduit 7 may be retained within the coupling 20. When the release ring 42 is pressed toward the second end 50, the coupling 20 is in the disengaged configuration to permit removal of the end 8 from the coupling 20.

As shown, the release ring 42 also has a pair of release grips 74 extending in the transverse direction 16. The release grips 74 may be easily gripped and/or pressed in the longitudinal direction 12 to press the release ring 42 toward the second end 50 of the body 40. The release grips 74 facilitate movement of the release ring 42 in the longitudinal direction 12 by providing contact surfaces 75 that are generally perpendicular to the longitudinal direction 12. The contact surfaces 75 are easily and comfortably pressed by a user's fingers and/or thumb to exert the necessary pressure on the release ring 42. The release grips 74 may also facilitate one-handed actuation of the coupling 20 between the engaged and disengaged configurations.

The release ring 42 also has an interior sleeve 76 that defines a bore 78 into which the end 8 of the conduit 7 is inserted. A countersink 80 of the release ring 42 is disposed outside of and adjacent to the bore 78 to facilitate insertion of the end 8 into the bore 78. The release ring 42 has an annular wall 82 that extends from the interior sleeve 76 to the exterior sleeve 70. The shoulder 51 has an axis 84 extending along the longitudinal direction 12. The axis 84 is shared by the exterior sleeve 70, the interior sleeve 76, the annular wall 82, and a bore (not shown) of the body within the shoulder 51.

In alternative embodiments, the release ring 42 may simply be omitted. The corresponding coupling (not shown) may then be designed to permanently (i.e., non-releasably) retain the end of a conduit. Alternatively, such a coupling may release the end of the conduit in response to pressure from an external implement, such as a collar (not shown)

slidable around the conduit. Such a collar may have two halves that are hinged or otherwise separable to permit removal of the collar from the conduit so that a single collar can be used to trigger release of a plurality of couplings.

Returning to the embodiment of FIG. 2, the conduit 7 has an indicator 86 disposed on its outside diameter. The indicator 86 indicates the size of the conduit 7, and may more particularly relate to the magnitude of the outside diameter of the conduit 7. Different manufacturers make flexible irrigation tubing in similar, and yet significantly different sizes. Consequently, a user may find it difficult to determine which irrigation implements are attachable to a given length of flexi-pipe. The indicator 86 is easily visible to the user to indicate the size of the conduit 7.

In this application, "indicating the size" does not necessarily require conveying the numerical size to a user; rather, only the category within which the size falls need be conveyed. Thus, the indicator 86 need not include letters or numbers, but may simply be a color. In the embodiment of FIG. 2, the indicator 86 is the color blue. The color blue may be useful because there is very little structure underground, whether natural or man-made, that is blue. The entire conduit 7 may have a blue color, which may be provided by injection molding the conduit 7 from blue plastic. Consequently, the indicator 86 may be easily visible, even when the conduit 7 is partially buried. Apart from use of the indicator 86 to indicate the size of the conduit 7, such a feature makes the conduit 7 easier to see and distinguish from other subterranean objects. Other colors besides blue may, of course, alternatively be used for the indicator 86.

The coupling 20, or more specifically, the body 40, may also have an indicator 88. The indicator 88 indicates the size of the conduit receivable by the coupling 20 to provide a fluid-tight connection. The indicator 86 may thus correspond to the indicator 88 to show that the coupling 20 is compatible with the conduit 7. The indicator 86 may even be substantially the same as the indicator 88. Indicators that are "substantially the same" are indicators that would be visually recognized as pertaining to compatible or corresponding parts. If desired, the body 40 (and/or the remainder of the coupling 20) may be formed of blue plastic, and the conduit 7 may similarly be formed of plastic of the same blue color to indicate that they are connectable to each other. In alternative embodiments, the indicator 88 may be disposed on the release ring 42 in addition to or instead of on the body 40.

Figure 3:
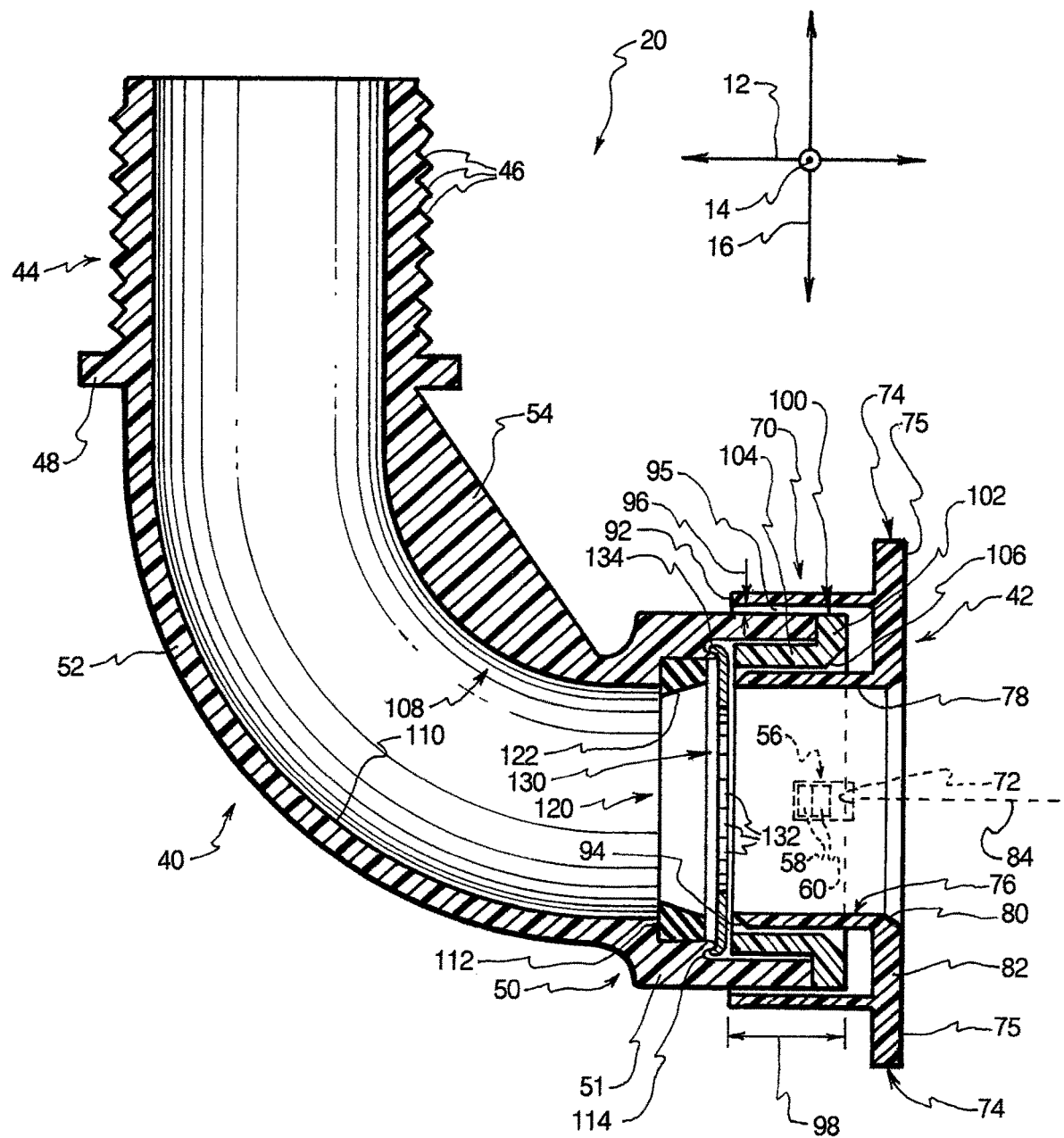
FIG. 3 is an enlarged cross-sectional elevation view of the coupling of FIGS. 1 and 2 in the engaged configuration thereof, wherein the coupling captures the end of any conduit inserted into the coupling.

Referring to FIG. 3, a side elevation, section view illustrates the coupling 20, in isolation from the remainder of the fluid system 10. The coupling 20 is shown in the engaged configuration, as in FIGS. 1 and 2. Features of the interior of the coupling 20 will now be described, in connection with FIG. 3.

As shown, the exterior sleeve 70 of the release ring 42 has a countersink 92, which is oriented generally inward. The interior sleeve 76 also has a countersink 94, which is oriented generally outward. The countersinks 92, 94 are thus both oriented toward the corresponding surfaces of the shoulder 51 to facilitate assembly of the release ring 42 and the body 40.

An annular gap 95 exists between the exterior sleeve 70 and the shoulder 51. The annular gap 95 is dimensioned such that a clearance 96 exists between the exterior sleeve 70 and the shoulder 51. The clearance 96, when applied to both sides of the second end 50 (i.e., the top and bottom sides, with reference to the view of FIG. 3), results in the existence of an overall doubling of the clearance 96. In order to prevent dirt entry into the annular gap 95, the clearance 96 may advantageously be less than about 0.02 inches. Furthermore, the clearance 96 may advantageously be less than about 0.01 inches, or even less than about 0.005 inches.

If desired, the clearance 96 may be the minimum clearance that still permits installation of the release ring 42 and the body 40. The clearance 96 may alternatively be the maximum clearance that generally keeps dirt from entering the annular gap 95 when the coupling 20 is buried. The tightness of the clearance 96 not only keeps dirt from the annular gap 95, but it also keeps dirt from entering the space inward of the annular wall 82. Thus, the clearance 96 helps to prevent dirt from increasing frictional resistance or direct physical interference with longitudinal motion of the release ring 42 toward the second end 50.

According to one embodiment, the diameter of the shoulder 51 and the inside diameter of the exterior sleeve 70 may have the same nominal value. When the release ring 42 and the body 40 are assembled, the exterior sleeve 70 may be stretched somewhat as the retention features 56 wedge apart opposite sides of the exterior sleeve 70 to slide into the retention slots 72 of the exterior sleeve 70. Thus, the inside diameter of the exterior sleeve 70 may enlarge somewhat to provide the clearance 96. The clearance 96 is then sufficient to permit the release ring 42 to slide with respect to the second end 50, but small enough to restrict dirt entry into the annular gap 95.

The clearance 96 extends for a length 98 of the second end 50 sufficient to avoid dirt entry, and more particularly, to keep dirt from passing through the annular gap 95 to interfere with the sliding motion of the release ring 42. The length 98 may advantageously be over one-quarter inch. In alternative embodiments, the length 98 may be as small as one-eighth of an inch or three-sixteenths of an inch, or as great as one-half inch or three-eighths of an inch. The length 98 shown is when the release ring 42 is positioned to retain the end 8 of the conduit 7, which is the position in which the release ring 42 is normally disposed.

The coupling 20 has a retainer ring 100 in addition to the body 40 and the release ring 42. The retainer ring 100 has a lip 102 that extends outward (i.e., in the lateral and transverse directions 14, 16) adjacent to the edge of the shoulder 51. The retainer ring 100 also has a sleeve 104 extending generally within the second end 50. A countersink 106 is disposed at the juncture of the sleeve 104 with the lip 102 to facilitate assembly of the release ring 42 with the retainer ring 100.

As shown, the body 40 has a bore 108 that extends from the first end 44 to the second end 50. The bore 108 curves along with the bend 52 and, as it passes through the second end 50, shares the axis 84. The bore 108 has a retention portion 110 sized to receive the end 8 of the conduit 7. The retention portion 110 may be sized to press inward against the end 8 in such a manner that the retention portion 110 grips the end 8 to keep the conduit 7 in place. The bore 108 also has a flat step 112 at which the diameter of the bore 108 steps up from that of the retention portion 110. Furthermore, the bore 108 has a lipped step 114 at which the diameter of the bore 108 steps up from that of the region between the flat step 112 and the lipped step 114.

A seal ring 120 is seated against the flat step 112. The seal ring 120 is formed of a resilient material such as rubber. The seal ring 120 has a generally annular shape, with a countersink 122 facing inward and toward the release ring 42. A spring washer 130 is seated against the lipped step 114. The spring washer 130 has a plurality of fingers 132 that extend inward. The spring washer 130 also has a peripheral lip 134 that curls over the lipped step 114 so that the peripheral lip 134 is unable to contract excessively during deflection of the spring washer 130. The configuration of the spring washer 130 will be shown and described with greater clarity in connection with FIG. 4.

The coupling 20 may be fabricated in a variety of ways. According to one method, the body 40, the release ring 42, and the retainer ring 100 are all formed of plastic via injection molding. Blow molding, stamping, or other methods may alternatively be used. The seal ring 120 may be injection molded of an elastomer such as rubber, and the spring washer 130 may be stamped of a metal such as steel, stainless steel, or aluminum.

The seal ring 120 may first be inserted into the bore 108 of the body 40 along the longitudinal direction 12 and seated against the flat step 112 of the bore 108. The spring washer 130 may then be inserted into the bore 108 along the longitudinal direction 12 and seated against the lipped step 114 in such a manner that the peripheral lip 134 of the spring washer 130 engages the lipped step 114.

After the seal ring 120 and the spring washer 130 have been installed, the retainer ring 100 may be inserted into the bore 108 of the body 108 along the longitudinal direction 12 in such a manner that the sleeve 104 of the retainer ring 100 rests directly within the second end 50, as shown in FIG. 3. The sleeve 104 may then abut or be disposed directly adjacent to the peripheral lip 134 of the spring washer 130 so that the retainer ring 100 keeps the spring washer 130 in place. The spring washer 130, in turn, keeps the seal ring 120 in place.

When the retainer ring 100 has been disposed in the position illustrated in FIG. 3, the retainer ring 100 may be ultrasonically welded, thermally welded, adhesive bonded, or otherwise attached to the second end 50. If desired, an annular bead (not shown) may be formed on the lip 102 of the retainer ring 100 at a position such that the annular bead is sandwiched between the lip 102 and the second end 50 when the retainer ring 100 is installed. The annular bead may then fuse with the second end 50 during ultrasonic welding to secure the lip 102 to the second end 50.

When the retainer ring 100 has been secured, the release ring 42 may be inserted into engagement with the second end 50 along the longitudinal direction 12. The release ring 42 is inserted such that the interior sleeve 76 passes through the countersink 106 and into the sleeve 104 of the retainer ring 100. The countersinks 106, 94 cooperate to facilitate insertion and centering of the interior sleeve 76 of the release ring 42 within the sleeve 104 of the retainer ring 100. Simultaneously, the exterior sleeve 70 of the release ring 42 passes around the lip 102 of the retainer ring 100 and around a portion of the shoulder 51, as shown in FIG. 3. The countersink 92 of the exterior sleeve 70 aids insertion and centering of the exterior sleeve 70 around the lip 102 and the second end 50.

As the sleeves 70, 76 engage the retainer ring 100 and the second end 50, the exterior sleeve 70 expands in the lateral direction 14 to pass around the retention feature 56, as described previously. The ramps 60 are positioned such that the release ring 42 is able to be inserted longitudinally over the second end 50 so that the ramps 60 cause the exterior sleeve 70 to expand in the lateral direction 14, thereby permitting continued motion of the release ring 42 in the longitudinal direction 12. The exterior sleeve 70 extends around the retention features 56 until the retention features 56 are captured within the retention slots 72 of the exterior sleeve 70. If desired, the exterior sleeve 70 may have interior grooves (not shown) extending from the retention slots 72 to the countersink 92 to facilitate passage of the exterior sleeve 70 over the retention features 56.

Once the retention slots 72 have moved far enough to capture the retention features 56, the coupling 20 is fully assembled and ready for use. The spring washer 130 exerts pressure on the countersink 94 of the interior sleeve 76 of the release ring 42 to urge the release ring 42 to remain positioned as in FIG. 3, so that the coupling 20 remains in the engaged configuration. The engagement of the retention features 56 with the retention slots 72 keeps the release ring 42 from moving further from the body 40 and the retainer ring 100.

The end 8 of the conduit 7 may be easily engaged within the coupling 20. More precisely, the end 8 may be inserted into the bore 78 of the interior sleeve 76 along the longitudinal direction 12. The end 8 may be pushed deeper into the coupling 20 so that the end 8 passes through the spring washer 130, thereby causing the fingers 132 of the spring washer 130 to deflect outward (i.e., in the lateral and transverse directions 14, 16), and toward the retention portion 110 of the bore 108 of the body 40. The end 8 then passes through the seal ring 120 and may optionally be pushed into the retention portion 110 until the outer wall of the end 8 abuts the retention portion 110.

Alignment of the end 8 with the seal ring 120 during insertion is facilitated by the countersink 122 of the seal ring 120. The seal ring 120 presses against the end 8 to form a substantially fluid-tight seal (i.e., a watertight seal in the context of an irrigation system). The seal keeps fluid from leaking out of the coupling 20 through the second end 50 at pressure differentials up to the maximum operating pressure of the fluid system 10. Accordingly, fluid loss can be avoided without complicating the process of attaching the end 8 to the coupling 20.

When the end 8 is disposed within the retention portion 110, the spring washer 130 is deflected in such a manner that, if the conduit 7 is drawn longitudinally outward, the fingers 132 seat themselves in the conduit 7 to prevent withdrawal of the end 8 from the coupling 20. Hence, the end 8 cannot be withdrawn from within the coupling 20 without moving the coupling 20 to the disengaged configuration, which will be shown and described subsequently, in connection with FIG. 4.

Figure 4:
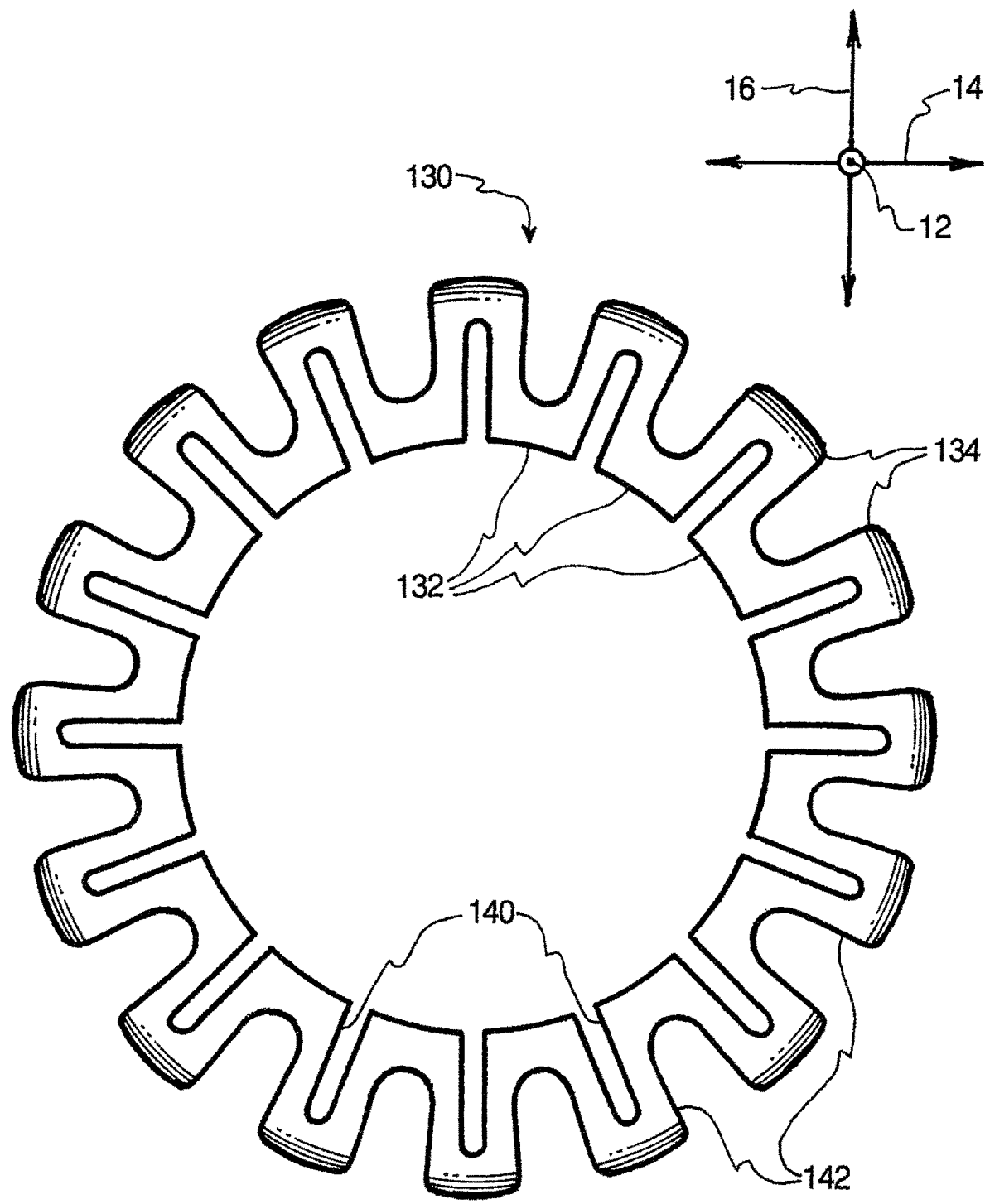
FIG. 4 is a front elevation view of a spring washer disposed within the coupling of FIGS. 1-3

Referring to FIG. 4, a front elevation view illustrates the spring washer 130 in isolation, in substantially undeflected form. As shown, the fingers 132 extend inward from the peripheral lip 134. The peripheral lip 134 extends in the longitudinal direction 12, i.e., toward the retention portion 110 of the bore 108 of the body 40 (shown in FIG. 3). In this application, "finger" does not denote any specific shape or length-to-width ratio. Rather, a "finger" is simply an extension. In alternative embodiments, a spring washer may have fewer fingers, each of which extends around a substantial portion of the diameter of the end 8. For example, only two fingers, each of which has a near-semicircular profile, may be disposed on either side of such a spring washer to retain the end 8.

Returning to the embodiment of FIG. 4, the spring washer 130 has a plurality of interior slots 140 that separate the fingers 132 from each other. The interior slots 140 are arrayed in generally radial fashion. The spring washer 130 also has a plurality of exterior slots 142 that facilitate flexing of the fingers 132 in the longitudinal direction 12 and enable the peripheral lip 134 to maintain its size and engagement with the lipped step 114 during flexing of the fingers 132.

Figure 5:
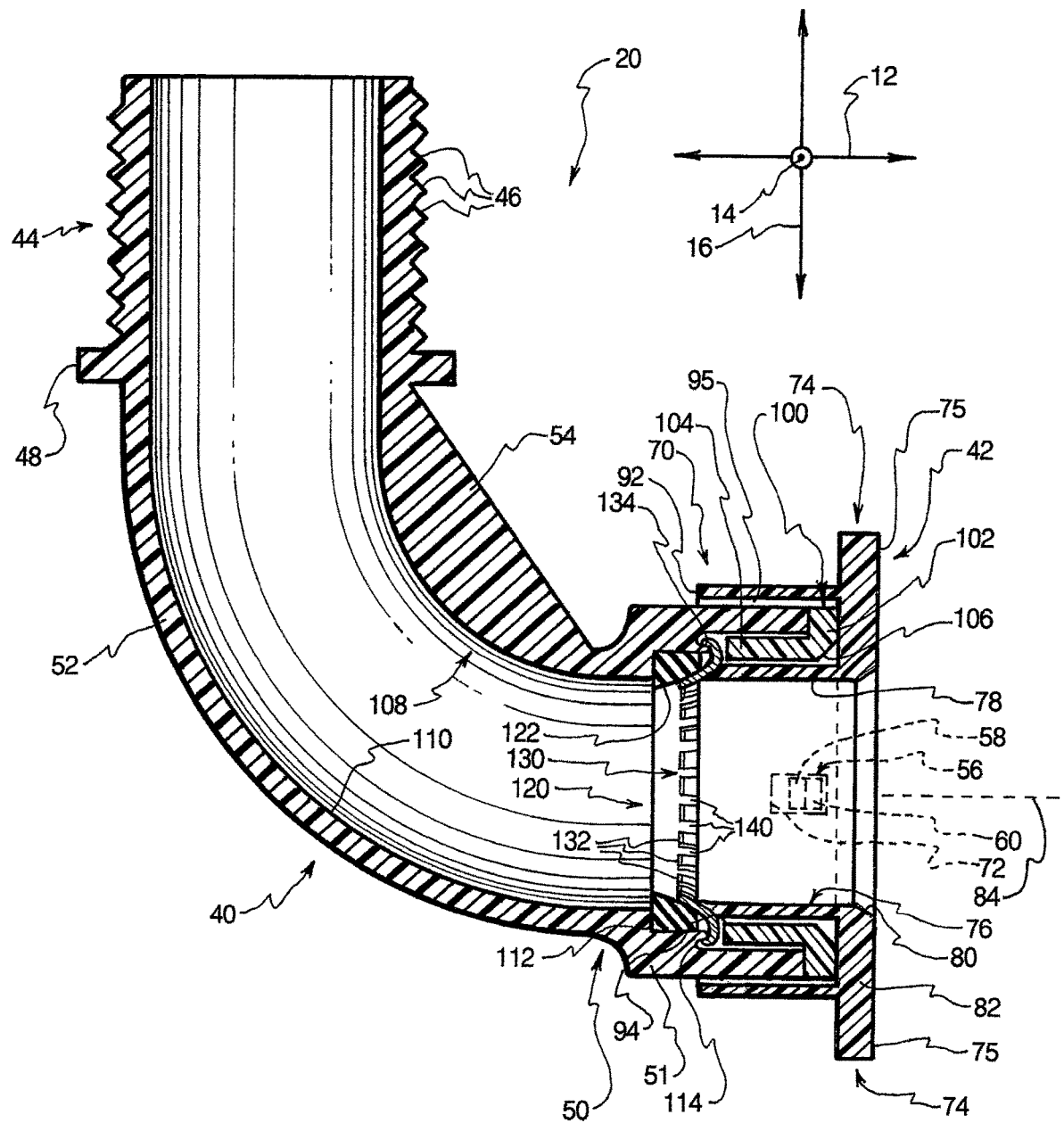
FIG. 5 is an enlarged cross-sectional elevation view of the coupling of FIGS. 1-3 in the disengaged configuration thereof, wherein the end of any conduit captured in the coupling is released therefrom.

Referring to FIG. 5, a side elevation, section view illustrates the coupling 20 in the disengaged configuration. The release ring 42 is simply actuated longitudinally toward the retainer ring 100 by, for example, holding the body 40 and pressing the release grips 74 of the release ring 42 toward the body 40. The interior sleeve 76 of the release ring 42 moves further into the bore 108 and the countersink 94 of the interior sleeve 76 presses against the spring washer 130.

The release ring 42 may move longitudinally until the annular wall 82 of the release ring 42 abuts the lip 102 of the retainer ring 100. At this point, the retention slots 72 have moved such that the retention features 56 are disposed at the opposite end of the retention slots 72 from their position in the engaged configuration.

In response to pressure from the countersink 94 of the interior sleeve 76, the fingers 132 deflect toward the retention portion 110 of the bore 108, as illustrated in FIG. 5. The fingers 132 simultaneously bend outward to define a diameter larger than the outside diameter of the conduit 7. Thus, the fingers 132 no longer seat in the conduit 7, and the end 8 of the conduit 7 can be freely withdrawn along the longitudinal direction 12 from the bore 108.

The release ring 42 may then be released to permit the coupling 20 to return to the disengaged configuration. Then, the conduit 7 or a different conduit may then be coupled or re-coupled via insertion into the bore 108, as described previously.

Figure 6:
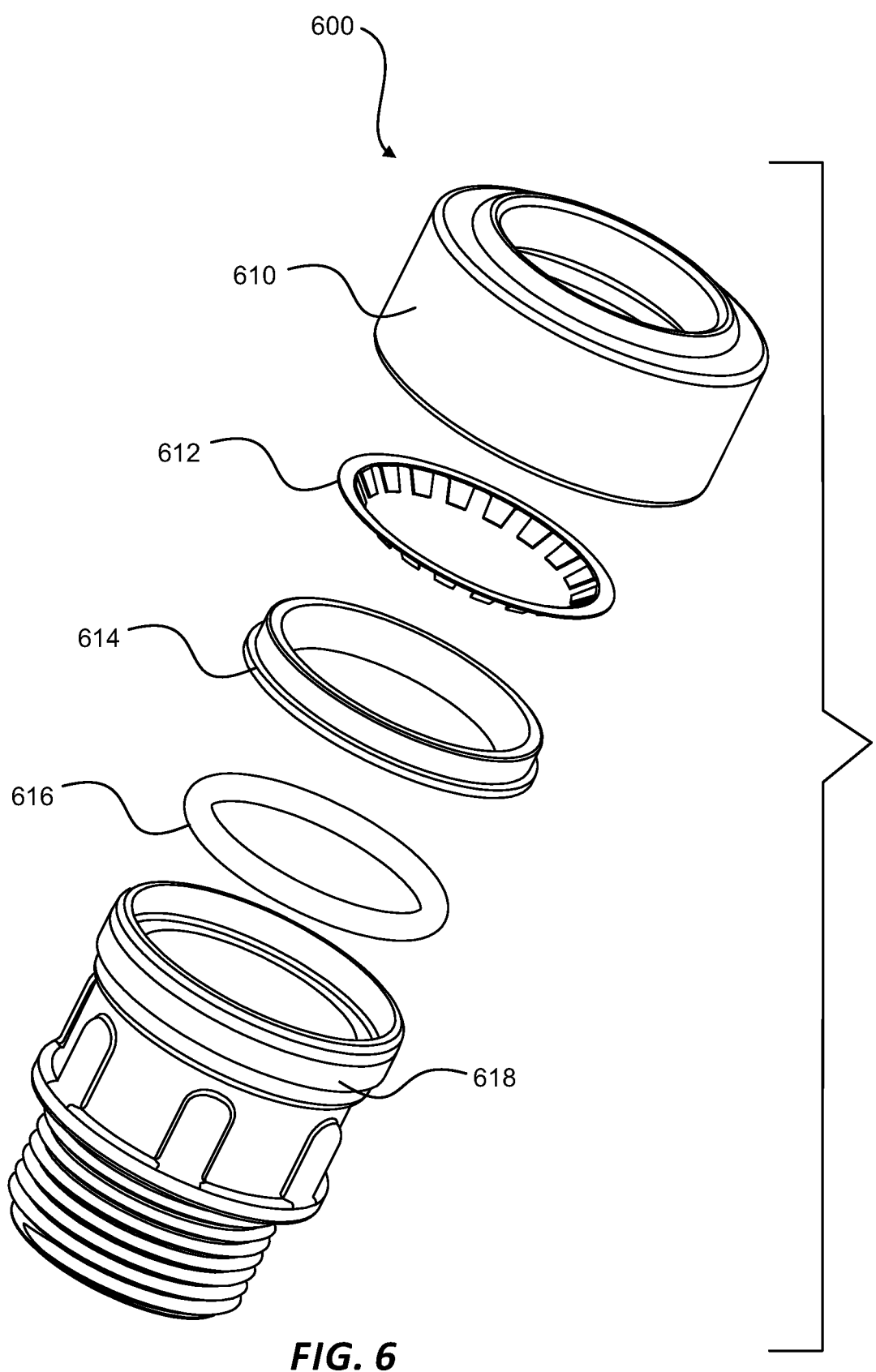
FIG. 6 is an exploded view of an alternative embodiment of a coupling.

FIG. 6 is an exploded view of an alternative embodiment of a coupling 600. The illustrated coupling 600 includes a first member 610, a gripping ring 612, a support ring 614, an O-ring 616, and a second member 618. The components 610-618 of the coupling 600 may be embodied in various ways within the scope of the disclosed subject matter and, as such, the components 610-618 are provided only for illustrative purposes.

Figures 7A, 7B:
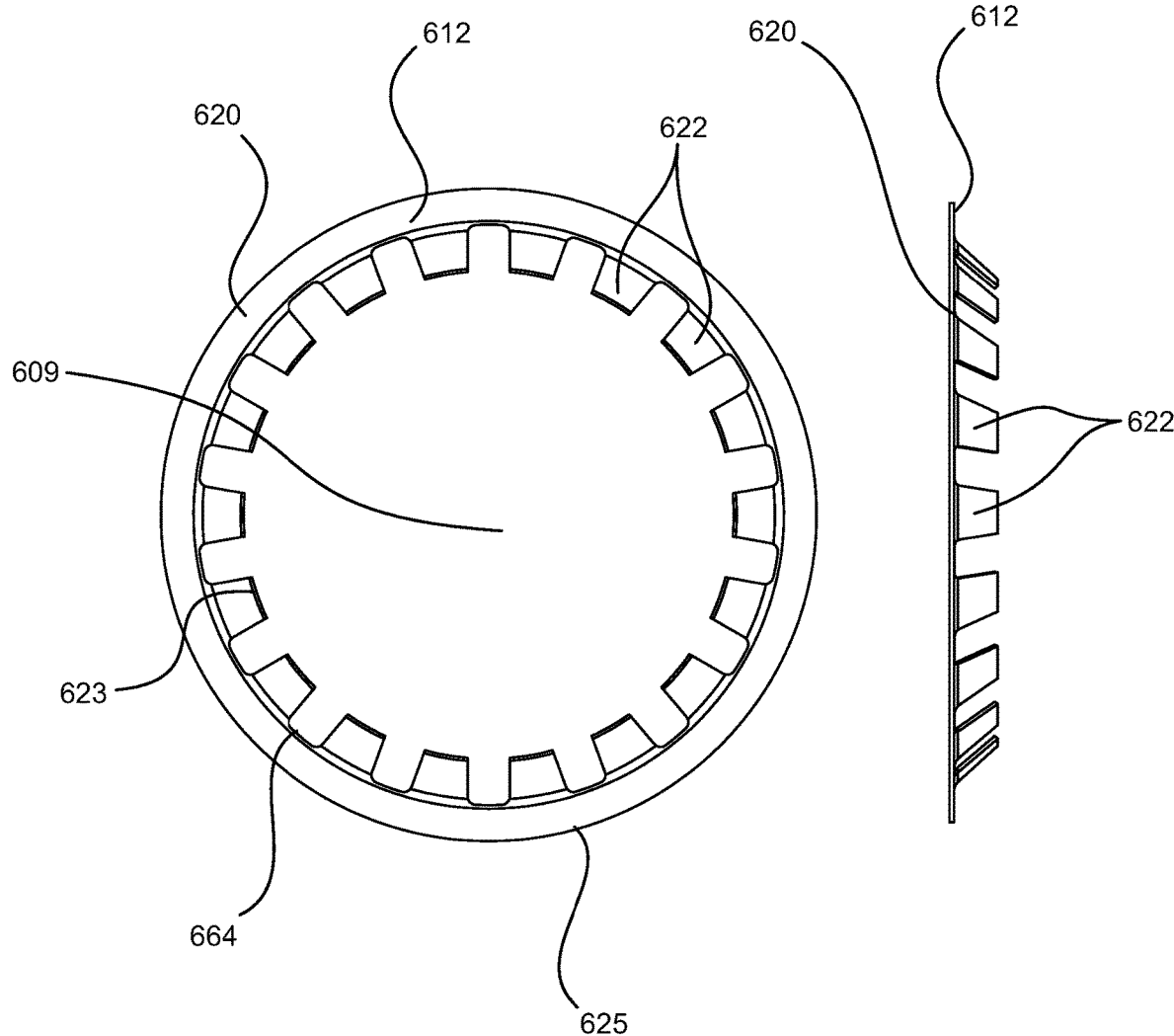
FIG. 7A is a top view of one embodiment of a gripping ring of the embodiment of the coupling of FIG. 6.
FIG. 7B is a side view of the gripping ring shown in FIG. 7A.

FIG. 7A is a top view of one embodiment of a gripping ring 612, and FIG. 7B is a side view of this embodiment of the gripping ring 612. An inner edge 664 of the gripping ring 612 defines a series of teeth 622. The teeth 622 project inwardly toward the center 613 of the gripping ring 612. As illustrated, the teeth 622 have a square inward tooth edge 623. Alternatively, for example, the teeth 622 may have a rounded inward tooth edge or a serrated inward tooth edge with multiple inward projections (not illustrated).

The teeth 622 may engage a conduit 7 (shown in FIG. 2) when the conduit 7 is disposed within the coupling 600. In particular, the teeth 622 may engage the outer surface 9 of the insertion end 8 of the conduit 7 (illustrated in FIG. 2). As explained previously, the outer surface 9 of the insertion end 8 of the conduit 7 may be smooth and free of grooves, flanges, and beads.

The teeth 622, as illustrated in FIG. 7B, are disposed at an angle with respect to an outer body 620 of the gripping ring 612. The angle of the teeth 622 relative to the outer body 620 enables the teeth 622 to better engage the conduit 7.

As illustrated in FIG. 7A, the outer body 620 has a generally annular shape with a rounded outer edge 625. The outer body 620 provides support for the teeth 622 and enables engagement between the gripping ring 612 and the first member 610.

Figure 8:
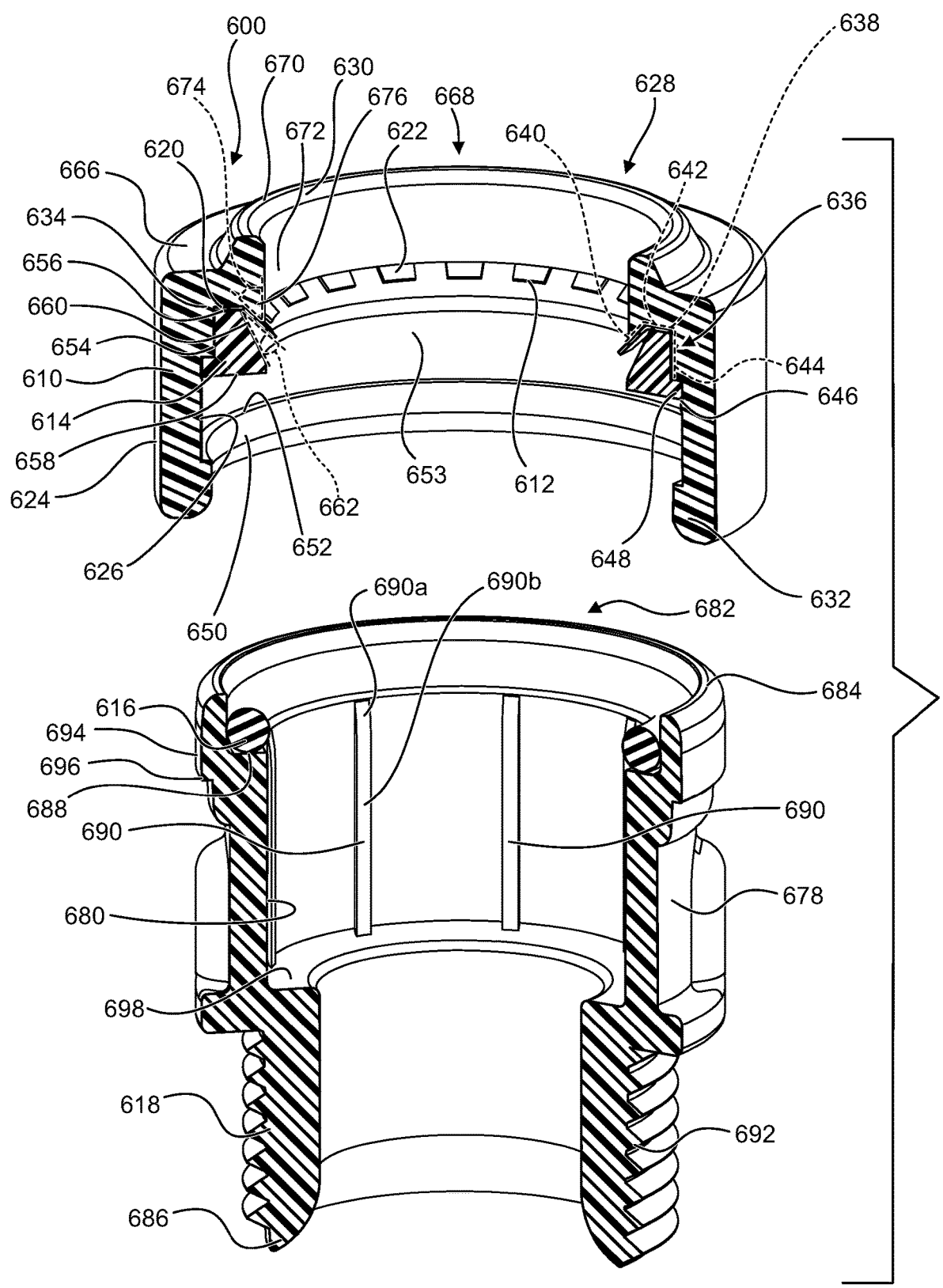
FIG. 8 is a partial cutaway and a partially exploded view of the coupling shown in FIG. 6.

FIG. 8 is a partially exploded and partially cutaway view of the coupling 600. As illustrated in FIG. 8, the gripping ring 612 and the support ring 614 may be sized to be rotatably disposed within the first member 610. In particular, the gripping ring 612 and the support ring 614 may be disposed within the circular recess 636 of the first member 610. Use of a separate support ring 614 reduces the cost of manufacturing the coupling 600. Also, rotation of the support ring 614 independent of the first and second members 610, 618 facilitates enhanced engagement between the coupling 600 and conduit 7.

The circular recess 636 may be defined by the recess defining portion 634 of an interior surface 626 of the first member 610. The recess defining portion 634 may comprise a J-shaped cross-sectional perimeter 638 (generally identified by dashed lines in FIG. 8). The J-shaped cross-shaped perimeter 638 may be generally in the shape of a hook or "J" and may comprise a first angled face 640 (generally identified by a dashed line in FIG. 8), a short face 642 (generally identified by a dashed line in FIG. 8), and a long face 644 (generally identified by a dashed line in FIG. 8). The first angled face 640, a short face 642, and the long face 644 may be linear, as illustrated in FIG. 8, or may be nonlinear. The short face 642 is disposed adjacent to the entry end 630 of the first member 610 and thus may be referred to as an adjacent face 642, while the long face 644 is disposed toward the outside or exterior of the first member 610 and thus may be referred to as an outside face 644. In one embodiment, the short face 642 may be longer than the long face 644. As illustrated in FIG. 8, the first angled face 640 may be disposed at an angle between 0° and 90° relative to the short face 642. In contrast, the short face 642 may be disposed at approximately a 90° angle relative to the long face 644.

An acute extension 676 of the first member 610 may define the first angled face 640. The first angled face 640 may be disposed at an acute angle 674 (generally identified by dashed lines in FIG. 8) with respect to a mouth region 672 of the first member 610 to form the acute extension 676. When the gripping ring 612 is disposed within the circular recess 636, the outer body 620 of the gripping ring 612 may abut the short face 642 of the J-shaped cross-sectional perimeter 638.

In one embodiment (as illustrated in FIG. 8), the teeth 622 of the gripping ring 612 may abut the first angled face 640 of the J-shaped cross-sectional perimeter 638 when the coupling 600 is in an unengaged position (i.e., not engaged with a conduit 7). When the teeth 622 engage a conduit 7, the teeth 622 may be drawn away from the first angled face 640 such that there is a space between at least a portion of each tooth 622 and the first angled face 640 depending on the direction of forces applied to the conduit 7 and the coupling 600.

As illustrated in FIG. 8, the support ring 614 may also be disposed within the circular recess 636. In one embodiment, the support ring 614 may include a proximal face 656, an exterior surface 654, an outward extension 648 defined by the exterior surface 654, a distal face 658, and a second angled face 660. The proximal face 656 and distal face 658 may be generally parallel. In contrast, the second angled face 660 may be nonparallel with respect to the exterior surface 654 (when seen from the cross-sectional view illustrated in FIG. 8) such that the support ring 614 generally increases in width from the proximal face 656 to the distal face 658. As a result, in one embodiment, the distal face 658 may be wider than the proximal face 656. The outward extension 648 may be generally annular in shape such that the outward extension 648 generally extends outwardly from the remaining portion of the exterior surface 654 of the support ring 614. Thus, the outward extension 648 is of a greater diameter than the remaining portions of the support ring 614 defined by the exterior surface 654.

When the support ring 614 is positioned within the first member 610, the outward extension 648 of the support ring 614 may engage and mate with a recessed region 646 of the first member 610. In such a condition, the proximal face 656 of the support ring 614 may abut the outer body 620 of the gripping ring 612, and the exterior surface 654 of the support ring 614 may abut the long face 644 of the J-shaped cross-sectional perimeter 638. As illustrated, the second angled face 660 of the support ring 614 may be disposed at an acute angle 662 (generally identified by dashed lines in FIG. 8) relative to the first angled face 640 of the J-shaped cross-sectional perimeter 638 when the coupling 600 is in an unengaged position. In an engaged position, pressures on an engaged conduit 7 and on the coupling 600 may push the first angled face 640 and the second angled face 660 closer or farther apart than illustrated in FIG. 8.

The illustrated first member 610 includes an exterior surface 624 and an interior surface 626. The interior surface 626 defines a first passageway 628 into which a conduit 7 may be inserted via an entry opening 668 and the mouth region 672 of the first member 610. The first passageway 628 may extend from an entry end 630 to a securing end 632 of the first member 610. The first member also includes an entry face 666. The entry face 666 may optionally include a raised portion 670 that surrounds the entry opening 668. The raised portion 670 increases the stability of a conduit 7 inserted within the coupling 600 thereby enhancing the seal between the conduit 7 and the coupling 600.

The first member 610 may also include an entry end 630 and the securing end 632. A conduit 7 is inserted through the entry end 630, while the securing end 632 is used to secure the first member 610 to the second member 618. Accordingly, when the first member 610 is secured to the second member 618, the securing end 632 may be disposed closer to the second member 618 than the entry end 630.

The first member 610 may also include a recessed engaging region 653 and an inward extension 650 that includes an engaging inward edge 652. These components enable a snap-fit engagement between the first member 610 and the second member 618. In particular, an outward annular extension 694 of the second member 618 is received into the recessed engaging region 653 of the first member 610. The outward engaging edge 696 of the second member 618 engages the engaging inward edge 652 of the first member 610 to maintain the first member 610 and the second member 618 in an interlocked state.

As illustrated in FIG. 8, the O-ring 616 is disposed within the second member 618. In particular, the O-ring 616 is disposed within the annular recess 688 of the second member 618. The annular recess 688, as illustrated, is disposed at an attachment end 684 of the second member 618.

The O-ring 616 may be embodied in various ways. For example, the O-ring 616 may have a round cross-sectional shape, as illustrated in FIG. 8. Alternatively, the O-ring 616 could have an oval, square, or rectangular cross-sectional shape.

The second member 618 includes an attachment end 684 and an opposite end 686. The attachment end 684 is received within the securing end 632 of the first member 610. In an alternative embodiment (not illustrated), the securing end 632 of the first member 610 is received within the attachment end 684 of the second member 618.

The second member 618 also includes an exterior surface 678 and an interior surface 680. The outward annular extension 694 and outward engaging edge 696, as mentioned above, are defined by the exterior surface 678 of the second member 618. In addition, the exterior surface 678 defines a threaded region 692. As illustrated, the threaded region 692 includes outward extending threads. In an alternative embodiment (not illustrated), the threaded region 692 may include inwardly extending threads or other securing mechanisms (such as features for facilitating a snap engagement with another component). In addition, adhesives or clamps may be used to secure the second member 618 to another component if, for example, the threaded region 692 is replaced with a smooth outer surface.

The interior surface 680 may define a series of tapered inward protrusions 690. The tapered inward protrusions 690 increase in depth, at least in certain portions, from the attachment end 684 to the opposite end 686. As illustrated in FIG. 8, each of the tapered inward protrusions 690 may include an inclined region 690a, which increases in depth relative to adjacent areas of the interior surface 680, and a flat region 690b, which maintains a generally constant depth relative to adjacent areas of the interior surface 680. The tapered inward protrusions 690 aid in centering a conduit 7 received within the coupling 600 and thus enhances a seal between the coupling 600 and a conduit 7 (i.e., enhances a seal between the conduit 7 and the O-ring 616). The tapered inward protrusions 690 may also serve to keep dirt and debris off the conduit 7 to further enhance the seal between the coupling 600 and conduit 7.

In addition, the interior surface 680 may also define a second passageway 682 within the second member 618. The second passageway 682 may extend from an attachment end 684 to an opposite end 686 of the second member 618. The second passageway 682 includes a stop surface 698. The stop surface 698 abuts a conduit 7 position within the coupling 600. The stop surface 698, like the tapered inward protrusions 690, aids in maintaining the conduit 7 properly positioned within the coupling 600 to further enhance the seal between the conduit 7 and the O-ring 616.

Figure 9:
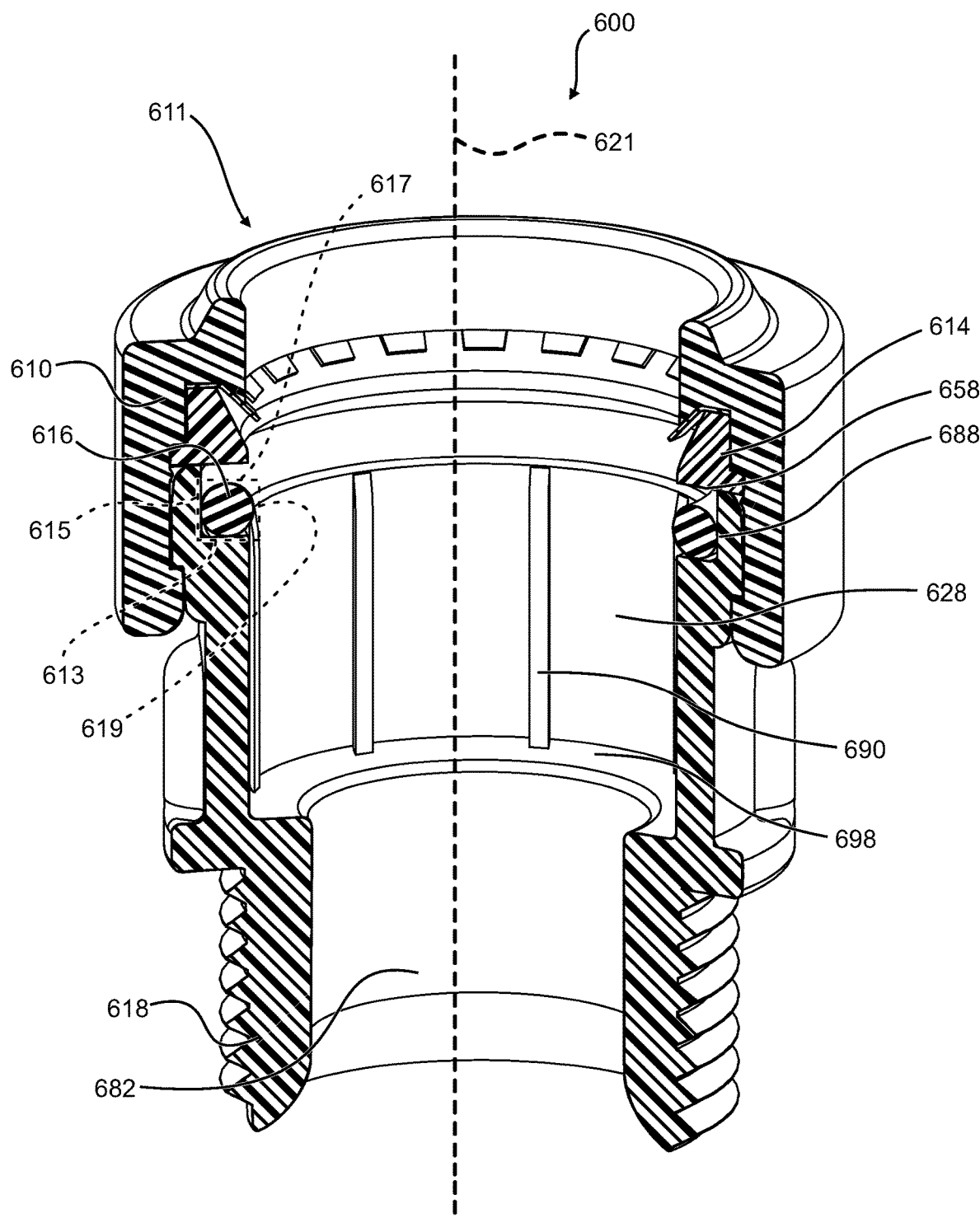
FIG. 9 is a partial cutaway view of the coupling of FIG. 6.

FIG. 9 is a partial cutaway view of the coupling 600 shown in FIG. 8. As illustrated in FIG. 9, the first member 610 is secured to the second member 618. In this state, the first passageway 628 of the first member 610 is in fluid communication with the second passageway 682 of the second member 618 and thus form a coupling passageway 611.

The coupling 600 may further comprise a longitudinal axis 621. As illustrated, the tapered inward protrusion 690 may be generally parallel to the longitudinal axis 621. In contrast, the stop surface 698 may be generally perpendicular to the longitudinal axis 621. The coupling passageway 611 may extend along a longitudinal axis 621 of the coupling 600.

As illustrated, the second member 618 encloses only a first and a second quadrant 613, 615 (generally identified by dashed lines in FIG. 9) of the annular recess 688. A third quadrant 617 (generally identified by a dashed line in FIG. 9) of the annular recess 688 is enclosed by the distal face 658 of the support ring 614. The fourth quadrant 619 (generally identified by a dashed line in FIG. 9) of the annular recess 688 is left exposed to enable free engagement of the O-ring 616 with a conduit 7 disposed within the coupling 600.

Figure 10:
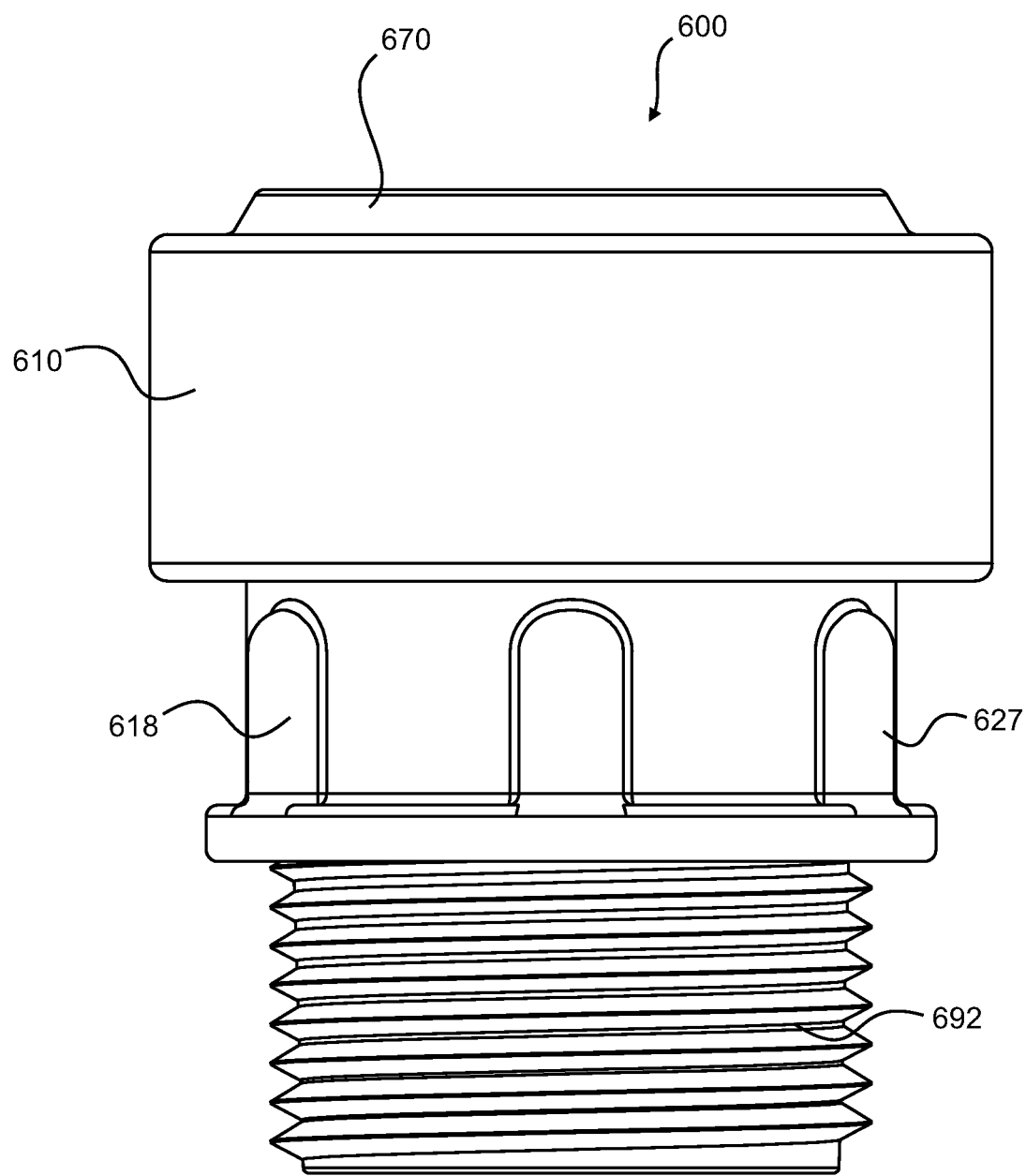
FIG. 10 is a side view of the coupling of FIG. 6.

FIG. 10 is a side view of the coupling 600 shown in FIG. 9. In this figure, the first member 610 is secured to the second member 618. This figure also illustrates the threaded region 692 and the raised portion 670 of the coupling 600. FIG. 10 further illustrates ribs 623 that may provide added strength to the coupling 600 and also facilitate gripping and rotation of the coupling 600 by a user.

With reference to FIG. 6-10, the coupling 600 may be manufactured in a number of different ways. For example, such a method may comprise:
  positioning the O-ring 616 within the annular recess 688
    of the second member 618 such that the second member 618 encloses two 613, 615 of the four quadrants 613, 615, 617, 619 of the annular recess 688, as illustrated FIG. 9;

positioning the gripping ring 612 within the circular 636 recess of the first member 610, as illustrated in FIG. 8;

positioning the support ring 614 within the circular recess 636 of the first member 610 such that the proximal face 656 of the support ring 614 abuts the gripping ring 612, as illustrated in FIG. 8; and placing the first member 610 in snap fit engagement with the second member 618 such that the distal face 658 of the support ring 614 encloses the third of the four quadrants 617 of the annular recess 688, as illustrated in FIGS. 9 and 10.

Positioning the gripping ring 612 within the circular recess 636 of the first member 610 may comprise positioning the outer body 620 of the gripping ring 612 such that the outer body 620 of the gripping ring 612 abuts the short face 642 and the series of teeth 622 of the gripping ring 612 abut the first angled face 640 of the generally J-shaped cross-sectional perimeter 638.

Positioning the support ring 614 within the circular recess 636 of the first member 610 may comprise positioning the support ring 614 within the circular recess 636 such that the proximal face 656 of the support ring 614 abuts the outer body 620 of the gripping ring 612 and the exterior surface 654 of the support ring 614 abuts the long face 644 of the J-shaped cross-sectional perimeter 638.

Figure 11:
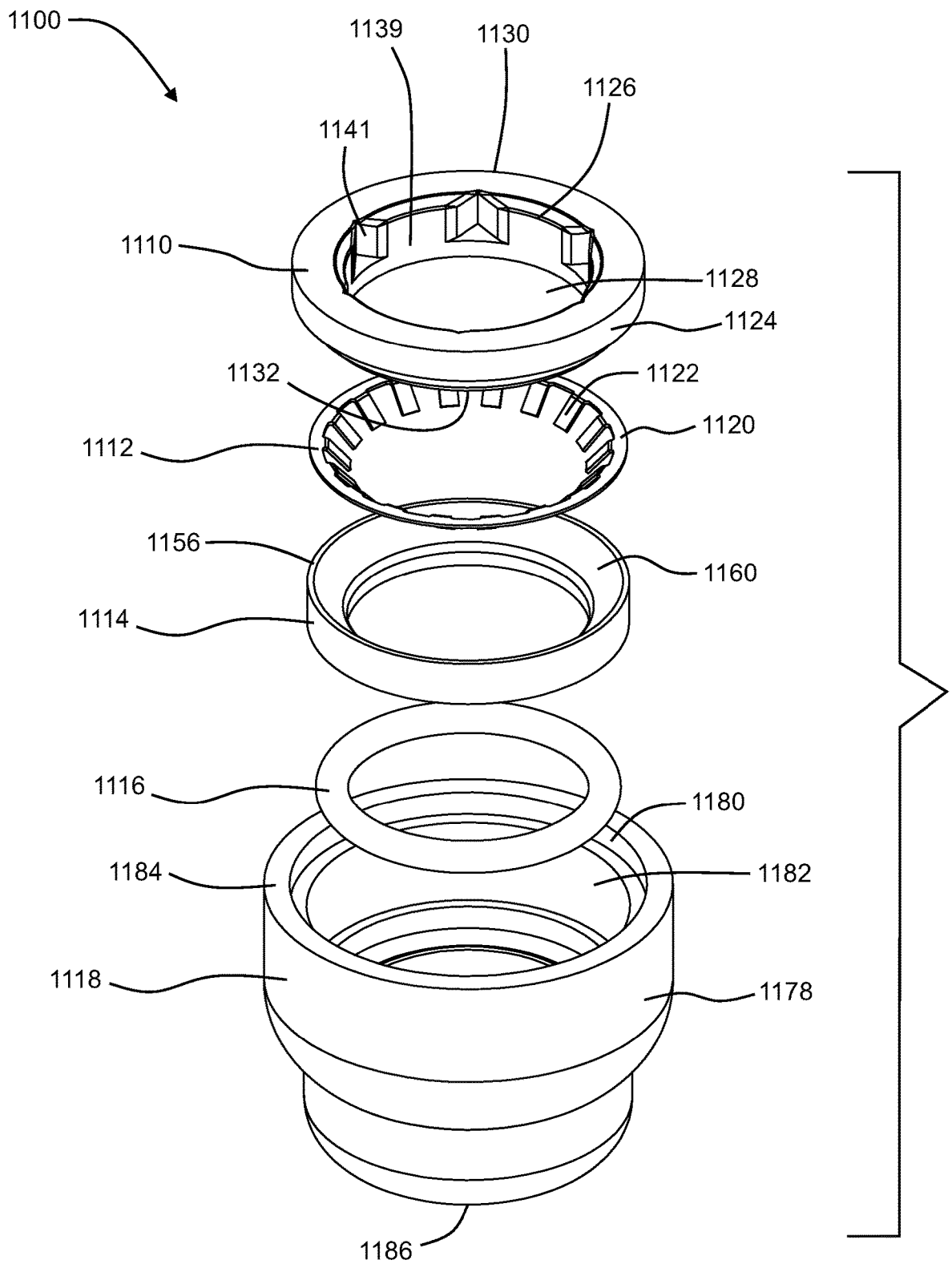
FIG. 11 is an exploded perspective view of an alternative embodiment of a coupling.

FIG. 11 comprises an exploded perspective view of an alternative embodiment of a coupling 1100. The coupling 1100 may include a first member 1110, a gripping ring 1112, a support ring 1114, an O-ring 1116, and a second member 1118. The embodiments of the first member 1110, gripping ring 1112, support ring 1114, O-ring 1116 and second member 1118 are only illustrative. These components 1110, 1112, 1114, 1116, 1118 may be varied in shape and physical composition within the scope of the disclosed subject matter to achieve the purposes disclosed directly or inferentially herein.

The illustrated first member 1110 includes an exterior surface 1124 and an interior surface 1126. The interior surface 1126 may define a first passageway 1128 that extends through the first member 1110 from an entry end 1130 to a proximal end 1132. The entry end 1130 is the end of the first member 1110 through which a conduit 1107 (shown in FIG. 17) will be inserted. The first member 1110 may also include a series of tool recesses 1141 with intervening tool recess protrusions 1139. As illustrated, the recesses 1141 and protrusions 1139 are disposed on the interior surface 1126 of the first member 1110. These recesses 1141 and protrusions 1139 enable the first member 1110 to interact with a tool. This tool may be utilized for rotation of the first member 1110 relative to the second member 1118 for purposes of, for example, spin welding the first member 1110 to the second member 1118. In an alternative embodiment (not illustrated), recesses 1141 and/or protrusions 1139 may be disposed on the exterior surface 1124 of the first member 1110. In one embodiment, the first member is made from acrylonitrile butadiene styrene (ABS).

The gripping ring 1112 illustrated in FIG. 11 includes an outer body 1120 and a series of inward projecting teeth 1122. As illustrated, the teeth 1122 have rectangular ends. In an alternative embodiment, the teeth 1122 may have, for example, rounded or serrated ends. Also, as illustrated in FIG. 11, the teeth 1122 are disposed at an angle other than 180° with respect to the outer body 1120. In an alternative embodiment, the teeth 1122 may be disposed at an 180° angle with respect to the outer body 1120, i.e., the teeth 1122 may project directly inward with respect to the outer body 1120. In one embodiment, the gripping ring 1112 is made from stainless steel.

FIG. 11 further illustrates one embodiment of a support ring 1114. The support ring 1114 may include a proximal face 1156 and an angled face 1160. When assembled, the proximal face 1156 abuts the outer body 1120 of the gripping ring 1112. The proximal face 1156 is adjacent to the angled face 1160. In one embodiment (as illustrated), the proximal face 1156 is disposed at an obtuse angle with respect to the angled face 1160. The support ring 1114 may be made from, for example, ABS.

FIG. 11 illustrates one embodiment of a seal, which, as illustrated, may comprise an O-ring 1116. The O-ring 1116 engages with and forms a fluid-tight seal with an appropriately sized conduit 1107 (shown in FIG. 17). The illustrated O-ring 1116 has a round cross-sectional shape. In an alternative embodiment, the O-ring 1116 may have, for example, an oval, hexagonal or octagonal cross-sectional shape. In one embodiment, the O-ring 1116 is made from ethylene propylene diene monomer (M-class) (EPDM) rubber.

One embodiment of a second member 1118 is illustrated in FIG. 11. As shown, the second member 1118 may include an interior surface 1180 and an exterior surface 1178. The interior surface 1180 may define a second passageway 1182 into which a conduit 1107 may be inserted when the coupling 1100 is assembled. The second member 1118 may include an attachment end 1184 and an opposite end 1186. The attachment end 1184 may be secured to the proximal end 1132 of the first member 1110 using, for example, a spin weld engagement. The second member 1118 may be made from ABS.

FIGS. 12-16 comprise exploded and partially exploded cross-sectional views of the coupling 1100 illustrated in FIG. 11. FIGS. 12-16 also illustrate one method of manufacturing the coupling of 1100. As illustrated in FIGS. 12-16, the coupling 1100 includes a longitudinal dimension 1198a, a lateral or radial dimension 1198b, and a transverse direction 1198c. With respect to FIG. 12, the first member 1110, gripping ring 1112, support ring 1114, O-ring 1116 and the second member 1118 are shown separated from each other before the identified manufacturing steps take place.

Figure 12:
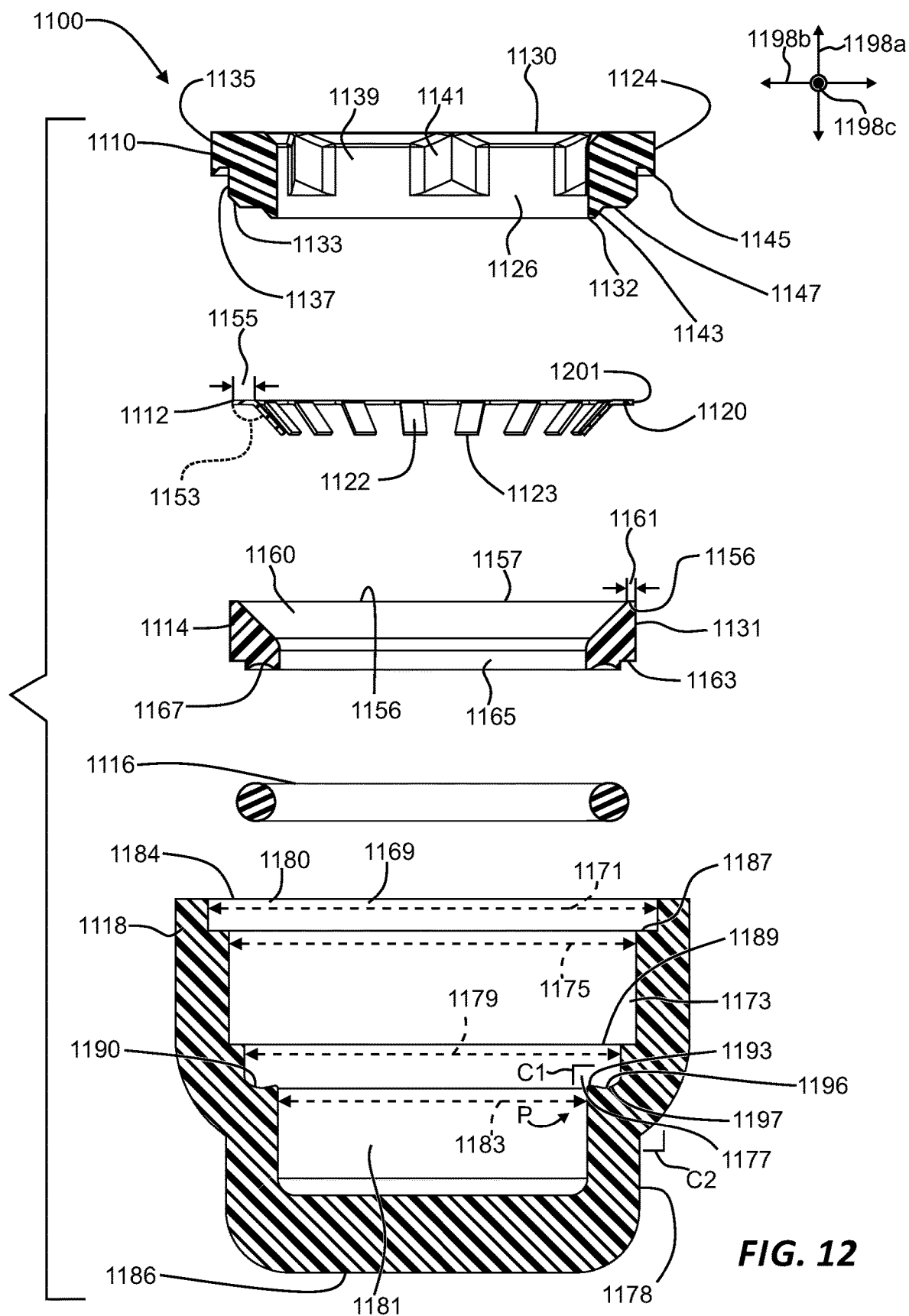
FIG. 12 comprises a cross-sectional view of the coupling of FIG. 11 in an unassembled condition.

FIG. 12 illustrates the first member 1110. As indicated above, the first member 1110 may comprise an exterior surface 1124 and an interior surface 1126. The first member 1110 may further comprise an entry end 1130, into which a conduit 1107 (shown in FIG. 17) may be inserted, and a proximal end 1132, which is closer to the second member 1118 following assembly. The interior surface 1126 may further define, in one embodiment, a series of tool receiving recesses 1141 and intervening tool receiving protrusions 1139, as explained previously. The exterior surface 1124 of the first member 1110 may define, in order from the entry end 1130 to the proximal end 1132, a first outer perimeter surface 1135, one or more energy directors 1145, a second outer perimeter surface 1137, a first beveled edge 1133, a perpendicular surface 1147, and a second beveled edge 1143. The energy director or directors 1145 provide a point or points of contact during welding of the first member 1110 to the second member 1118. Accordingly, the energy of the sonic or spin weld is focused, at least initially, on the energy director or directors 1145. When the coupling 1100 is assembled, the first outer perimeter surface 1135 and the second outer perimeter surface 1137 may contact or be welded to the interior surface 1180 of the second member 1118. The energy director 1145 may be disposed intermediate the first outer perimeter surface 1135 and the second outer perimeter surface 1137. The first outer perimeter surface 1135 and the second outer perimeter surface 1137 may be offset with respect to each other along a lateral or radial dimension 1198b of the coupling 1100, as illustrated in FIG. 12. Further, the first outer perimeter surface 1135, the energy director or directors 1145, the second outer perimeter surface 1137, the first beveled edge 1133, the perpendicular surface 1147, the second beveled edge 1143, and the proximal end 1132 may be offset from each other along a longitudinal dimension 1198a of the coupling 1100. The perpendicular surface 1147, as illustrated in FIG. 12, may be generally perpendicular to the first outer perimeter surface 1135 and the second outer perimeter surface 1137. In an alternative embodiment, the perpendicular surface 1147 is disposed at an angle other than 90° with respect to the first outer perimeter surface 1135 and the second outer perimeter surface 1137. In addition, it should be noted that the angle of the first beveled edge 1133 and the second beveled edge 1143 shown in FIG. 12 are only illustrative. These edges 1133, 1143 may be disposed at other angles with respect to the first and second outer perimeter surfaces 1135, 1137. Also, in one embodiment, the perpendicular surface 1147 and second beveled edge 1143 are omitted.

The gripping ring 1112 shown in FIG. 12 may include an inner edge 1123 that defines a series of teeth 1122. The gripping ring 1112 may further comprise an outer edge 1201 that defines an outer body 1120. The outer body 1120 may be disposed at an angle 1153 with respect to the teeth 1122. The angle 1153 may be embodied in various ways within the scope of the disclosed subject matter. For example, the angle 1153 may be obtuse (greater than 90°), such as a 120° angle or a 150° angle, as illustrated in FIG. 12. The outer body 1120 may further include a body width 1155, which represents the width of the outer body 1120 in a lateral or radial dimension 1198b. The teeth 1122 may engage a conduit 1107 (shown in FIG. 17) when the conduit 1107 is disposed within the coupling 1100.

FIG. 12 further illustrates one embodiment of the support ring 1114. The support ring 1114 may include an exterior surface 1131 disposed on the exterior or outer region of the support ring 1114 in a lateral or radial dimension 1198b. The support ring 1114 may further comprise an innermost surface 1165 disposed on the interior of the support ring 1114 in a lateral or radial dimension 1198b.

The support ring 1114 may further comprise a proximal face 1156 and an angled face 1160. A pivot edge 1157 may be disposed intermediate the proximal face 1156 and the angled face 1160. The proximal face 1156 may comprise a face width 1161, which represents the width of the proximal face 1156 in a lateral or radial dimension 1198b. In one embodiment, the face width 1161 is less than one-eighth of the body width 1155. In alternative embodiments, the face width 1161 may be less than one-quarter, one-half, or three-quarters of the body width 1155.

The support ring 1114 may further comprise an inward ledged recess 1163. The inward ledged recess 1163 may be generally configured in the shape of an inward step and may be disposed intermediate an O-ring recess 1167 and the exterior surface 1131. The O-ring recess 1167 may be disposed intermediate the innermost surface 1165 and the inward ledged recess 1163 and may be shaped to receive and mate with the O-ring 1116.

As illustrated in FIG. 12, the O-ring 1116 may have a circular cross-sectional shape, although other cross-sectional shapes may be employed. The O-ring 1116 may be, in one embodiment, generally annular in shape.

As explained above, the second member 1118 may include an exterior surface 1178 and an interior surface 1180 and an attachment end 1184 and an opposite end 1186. The interior surface 1180 may define a first recessed region 1169, a second recessed region 1173, a third recessed region 1177, and a fourth recessed region 1181. Each of the recessed regions 1169, 1173, 1177, 1181 may be separated by an intervening ledge 1187, 1189, 1190. In particular, a first ledge 1187 may be disposed intermediate the first recessed region 1169 and the second recessed region 1173; a second ledge 1189 may be disposed intermediate the second recessed region 1173 and the third recessed region 1177; and a third ledge 1190 may be disposed intermediate the third recessed region 1177 and the fourth recessed region 1181. The recessed regions 1169, 1173, 1177, 1181 and each of the ledges 1187, 1189, 1190 may be, as illustrated in FIG. 12, offset from each other in a longitudinal dimension 1198a. The first recessed region 1169 includes a first region width 1171, which represents a width of the first recessed region 1169 in a lateral dimension 1198b. The second recessed region 1173 includes a second region width 1175, which represents a width of the second recessed region 1173 in a lateral dimension 1198b. The third recessed region 1177 includes a third region width 1179, which represents a width of the third recessed region 1177 in a lateral dimension 1198b. Finally, a fourth recessed region 1181 includes a fourth region width 1183, which represents a width of the fourth recessed region 1181 in a lateral dimension 1198b. Moving from the attachment end 1184 toward the opposite end 1186 in a longitudinal dimension 1198a, the recessed regions 1169, 1173, 1177, 1181 may each be successively narrower in width 1171, 1175, 1179, 1183. The ordinal numbers (e.g., first, second, third, and fourth) of the recessed regions 1169, 1173, 1177, 1181, intervening ledges 1187, 1189, 1190, and other components in this application are used for convenience in distinguishing these features. In the claims, or other sections, different ordinal numbers may be applied to the particular components disclosed in this application based on, for example, the order in which these features are introduced into a particular discussion, claim or claim set. When desired, additional verbiage will be employed to identify a particular configuration or location of a region or feature, such as "a recessed region 1169 closest to an attachment end 1184 of the second member 1118."

As illustrated in FIG. 12, the interior surface 1180 of the second member 1118 defining the first recessed region 1169 comprises the first ledge 1187. The interior surface 1180 of the second member 1118 defining the second recessed region 1173 comprises the second ledge 1189, and the interior surface 1180 of the second member 1118 defining the third recessed region 1177 comprises the third ledge 1190.

Each of the ledges 1187, 1189, 1190 may be configured in different ways. For example, the first and second ledges 1187, 1189, as illustrated in FIG. 12, employee a 90° or right angle configuration, although different angles may be employed. Also, the ledges 1187, 1189, 1190 may have curved rather than flat and angled surfaces. In addition, the third ledge 1190, as shown in FIG. 12, comprises a raised inner lip 1193 and a recessed outer portion 1197, which includes an arcuate surface 1196 having an arcuate side, cross-sectional shape (i.e., a surface 1196 having an arcuate shape when seen in a side, cross-sectional view taken across the plane P defined by the corner portions C1, C2 such that the plane P crosses the ledge 1190 only once and does not cross the ledge on the opposite side of the second member 1118, which cross-sectional view is illustrated at reference numeral 1196 in FIG. 12). The raised inner lip 1193 may be disposed inward, in a radial dimension 1198b, relative to the recessed outer portion 1197. The arcuate surface 1196 of the recessed outer portion 1197 is generally curved and is dimensioned to receive a portion of the O-ring 1116. The third ledge 1190 is designed to minimize insertion force of a conduit 1107. When the conduit 1107 is inserted into the coupling 1100, the O-ring 1116 is displaced outwardly onto the arcuate surface 1196 of the recessed outer portion 1197 at least temporarily, thereby mitigating friction between the O-ring 1116 and the conduit 1107 and facilitating insertion of the conduit 1107 into the coupling 1100.

Figure 13:
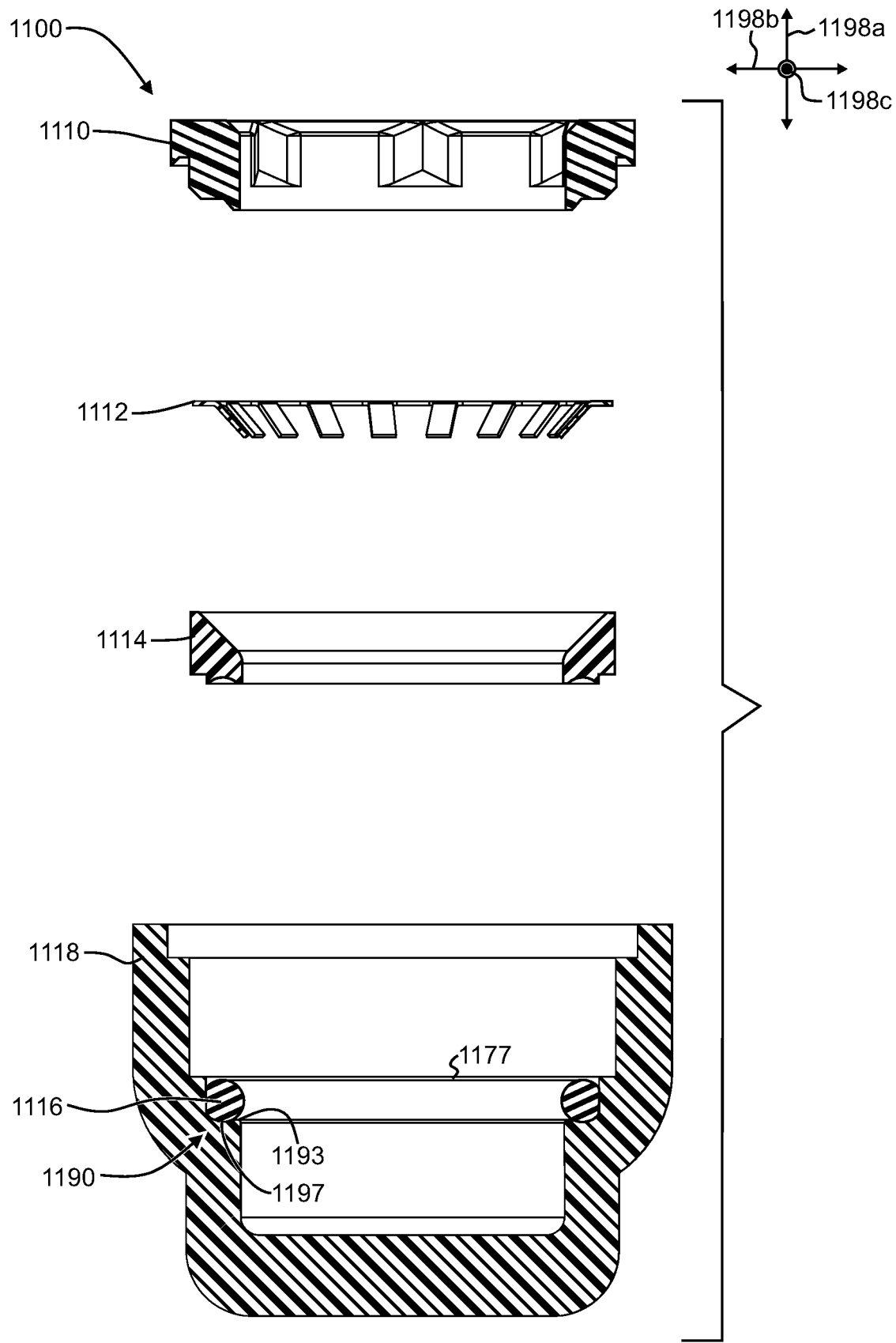
FIGS. 13-15 comprise cross-sectional views of the coupling of FIG. 11 shown in various partially assembled conditions.

FIG. 13 illustrates a further assembly step of the coupling 1100. In the illustrated step, the O-ring 1116 is positioned within the second member 1118. In particular, the O-ring 1116 is positioned within the third recessed region 1177 and is also positioned on the ledge 1190. More specifically, the O-ring 1116 is disposed on the recessed outer portion 1197 and the raised inner lip 1193 of the third ledge 1190. Depending on the size of the O-ring 1116, the O-ring 1116 may be disposed at various positions in a radial dimension 1198b on the third ledge 1190 and lip 1193 in a resting uncoupled position (i.e., when a conduit 1107 is not disposed within the coupling 1100 and the O-ring 1116). As shown in FIG. 13, the first member 1110, the gripping ring 1112 and the support ring 1114 have not been positioned within or secured to the second member 1118.

Figure 14:
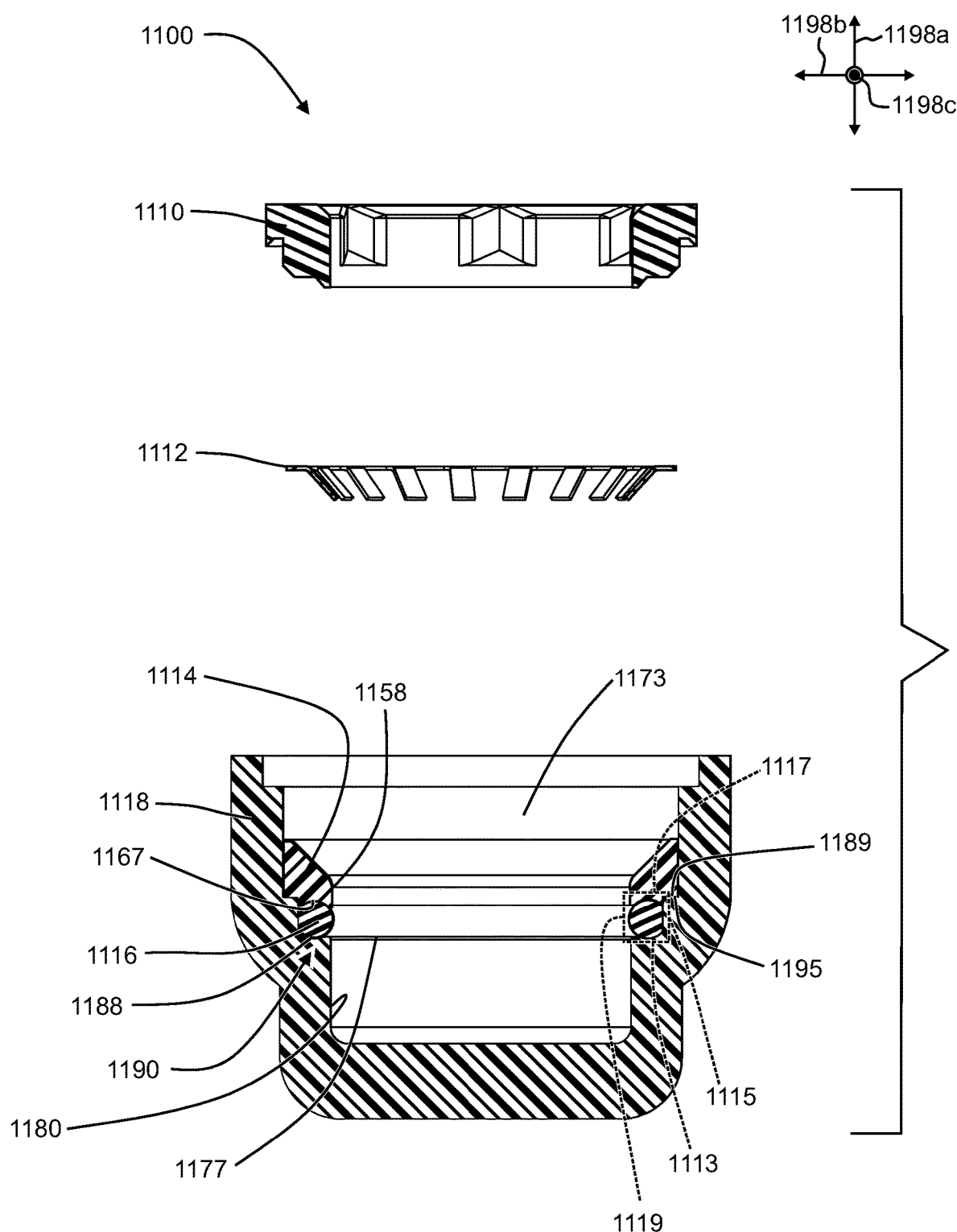

As illustrated in FIG. 14, in a next manufacturing step, the support ring 1114 may be positioned within the second member 1118 and may be specifically positioned within the second and third recessed regions 1173, 1177 of the second member 1118. As illustrated, the O-ring 1116 may be disposed within the O-ring recess 1167 of the support ring 1114. Further, the second ledge 1189 of the second member 1118 may be dimensioned to mate with and contact the inward ledged recess 1195 of the support ring 1114.

As shown in FIG. 14, the first member 1110 and gripping ring 1112 have not yet been positioned within or secured to the second member 1118 in the illustrated manufacturing step.

As illustrated, the O-ring 1116 is positioned or disposed in an annular recess 1188, which is defined, in part, by the third ledge 1190. The annular recess 1188 comprises four quadrants 1113, 1115, 1117, 1119. In the illustrated embodiment, the second member 1118 encloses only the first and second quadrants 1113, 1115 of the annular recess 1188. More specifically, the portion of the interior surface 1180 defining the third recessed region 1177 of the second member 1118 encloses only the first and second quadrants 1113, 1115 of the annular recess 1188. A third quadrant 1117 of the annular recess 1188 is enclosed by the support ring 1114 and, more specifically, by the distal face 1158 of the support ring 1114, the distal face 1158 being remote from the gripping ring 1112 when the coupling 1100 is assembled. In the illustrated embodiment, the O-ring recess 1167 is disposed on the distal face 1158 of the support ring 1114. A fourth quadrant 1119 of the annular recess 1188 is exposed such that the O-ring 1116 can interact with a conduit 1107 (shown in FIG. 17) within this quadrant 1119.

Figure 15:
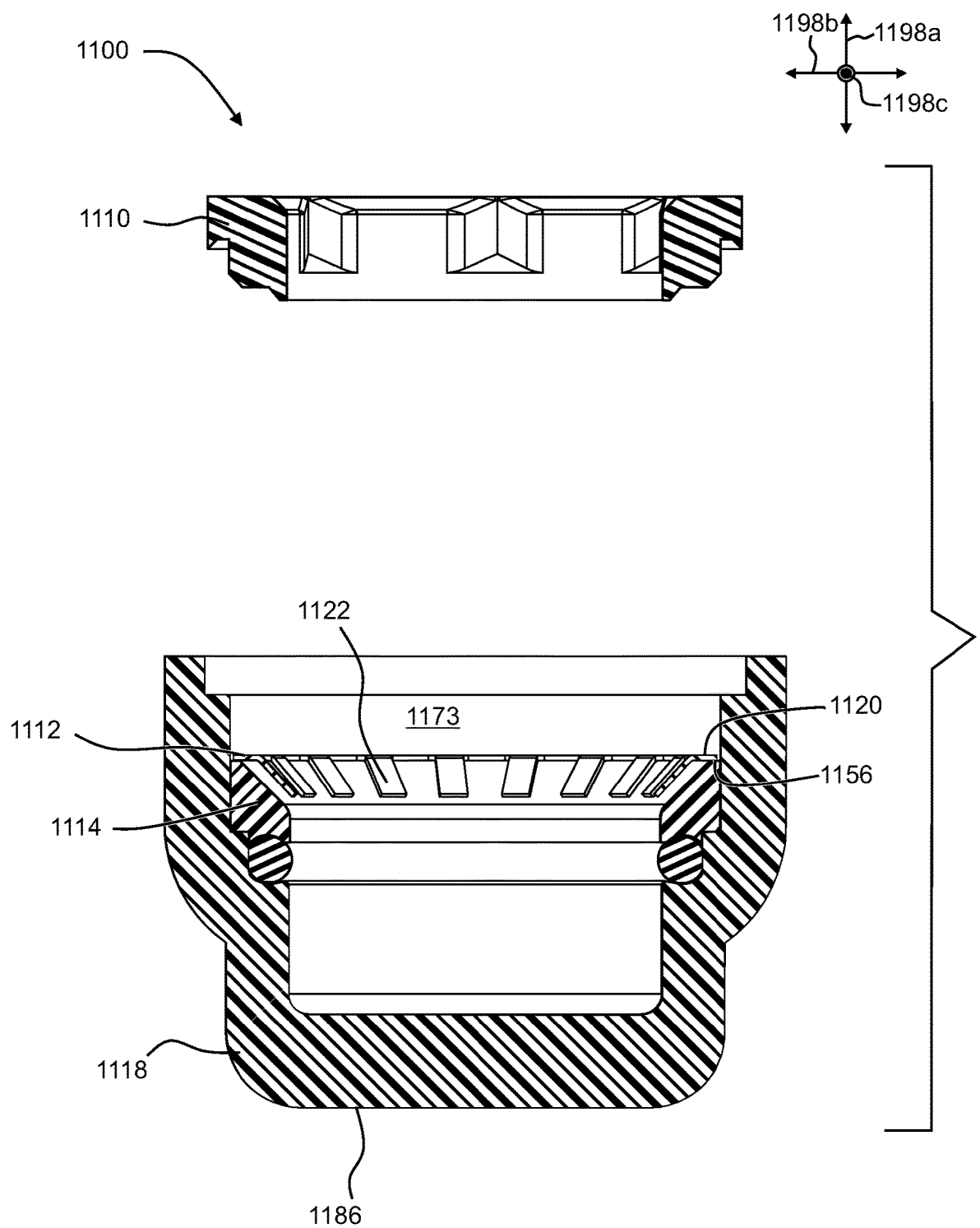

As shown in FIG. 15, the gripping ring 1112 may be positioned within the second recessed region 1173 such that the outer body 1120 abuts the proximal face 1156 of the support ring 1114. Because the face width 1161 (shown in FIG. 12) of the proximal face 1156 is less than the body width 1155 (shown in FIG. 12) of the outer body 1120 of the gripping ring 1112, the gripping ring 1112 flexes downwardly toward the opposite end 1186 of the second member of 1118 with greater ease during insertion of a conduit 1107 into the coupling 1100. This flexing action decreases the force required to insert the conduit 1107 into the coupling 1100. This decreased force also mitigates the friction between the teeth 1122 of the gripping ring 1112 and the conduit 1107 and may reduce the abrasion or damage to the conduit 1107 during the insertion process.

Figure 16:
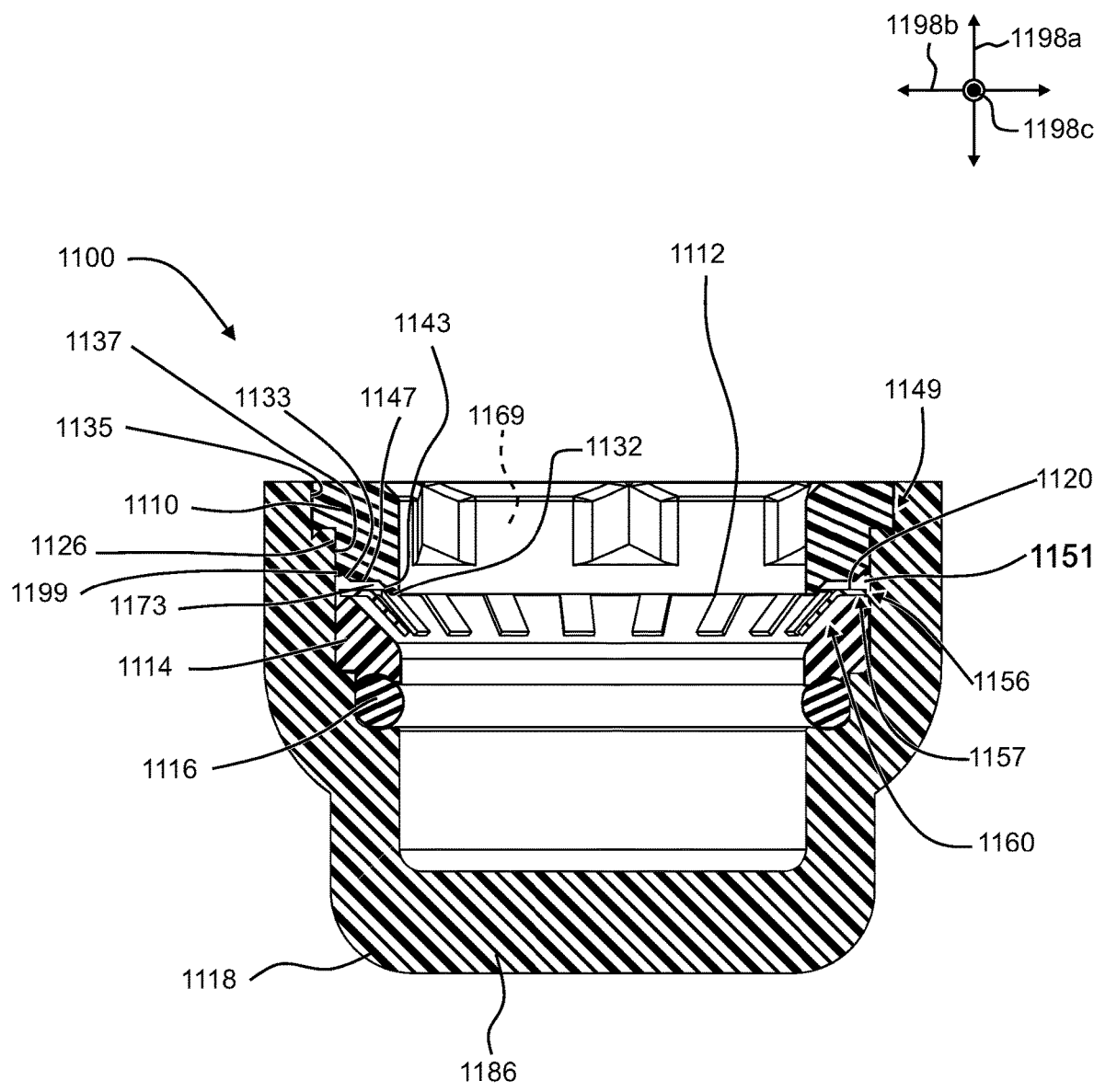
FIG. 16 comprises a cross-sectional view of the coupling of FIG. 11 shown in an assembled condition.

FIG. 16 illustrates, in one embodiment, a final step of manufacturing the coupling 1100. In this step, the first member 1110 is secured to the second member 1118 using, for example, adhesives, spin welding, or sonic welding. In the illustrated embodiment, a spin welding technique is employed resulting in a spin weld engagement 1149 between the first member 1110 and the second member 1118. Spin welding is a friction welding technique in which, for example, the first member 1110 is rotated to cause friction with the second member 1118 until sufficient heat is generated to weld or join the first and second member 1110, 1118 together. In contrast, sonic welding, sometimes known as ultrasonic welding, employs high-frequency vibrations to friction weld components together. As illustrated, the first member 1110 is positioned within the first recessed region 1169 and the second recessed region 1173 of the second member 1118. In such a condition, both the first outer perimeter surface 1135 and the second outer perimeter surface 1137 of the first member 1110 are positioned adjacent to and abut the interior surface 1126 of the second member 1118. As explained above, the term "abut," as used in this application, signifies physical contact with and/or being physically welded or bonded together. The first outer perimeter surface 1135 contacts the interior surface 1126 defining the first recessed region 1169, while the second outer perimeter surface 1137 contacts the interior surface 1126 defining the second recessed region 1173. The first beveled edge 1133, perpendicular surface 1147, second beveled edge 1143, and proximal end 1132 extend inwardly away from the interior surface 1126 of the second member 1118.

As shown, the first beveled edge 1133, perpendicular surface 1147, second beveled edge 1143 and proximal end 1132 of the first member 1110 together with the gripping ring 1112 and support ring 1114 define a cavity 1151 within the second recessed region 1173. This cavity 1151 may retain the flash weld deposits 1199 from a sonic weld such that these deposits 1199 do not attach to and interfere with the support ring 1114 and/or gripping ring 1112. In one embodiment, the gripping ring 1112 and the support ring 1114 are sized to enable rotation of either both or one of these items 1112, 1114 within and relative to the second member 1118. This rotation of the gripping ring 1112 and support ring 1114 enables the gripping ring 1112 to firmly adhere to the conduit 1107 (shown in FIG. 17), while mitigating scoring, abrasion, or damage to the conduit 1107 should the conduit 1107 be rotated following insertion into the coupling 1100.

As discussed previously, a pivot edge 1157 is disposed intermediate the proximal face 1156 and the angled face 1160 of the support ring 1114. This pivot edge 1157 enables the gripping ring 1112 to pivot toward the opposite end 1186 of the second member 1118, thus mitigating the insertion force required to insert a conduit 1107 into the coupling 1100.

Figure 17:
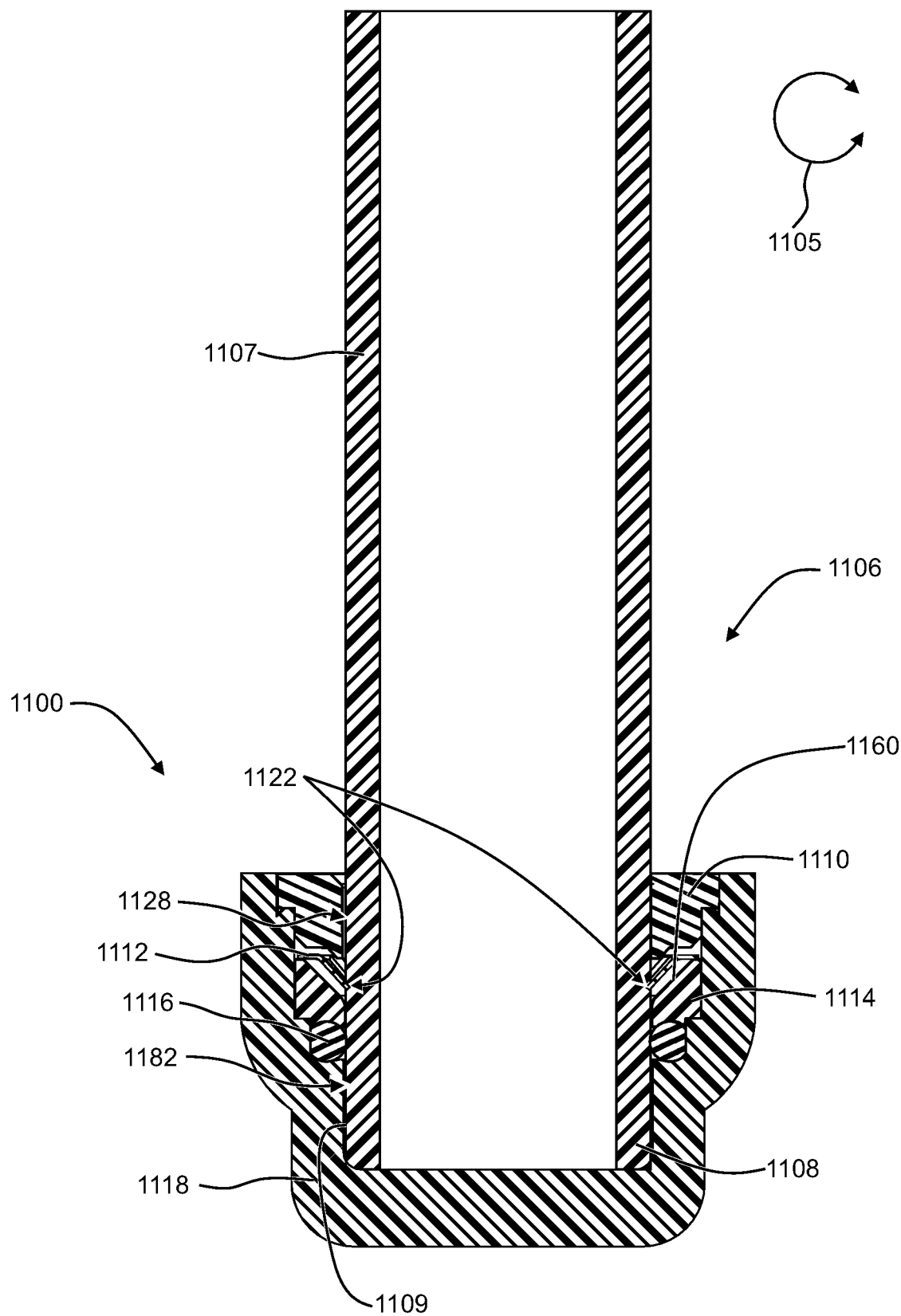
FIG. 17 comprises a cross-sectional view of the coupling of FIG. 11 shown with a conduit disposed therein.

FIG. 17 illustrates a coupling 1100 with a conduit 1107 secured therein. In particular, the conduit 1107 is positioned within the first passageway 1128 of the first member 1110 and the second passageway 1182 of the second member 1118, that is, the insertion end 1108 of the conduit 1107 has been moved through the first passageway 1128 and into the second passageway 1182. In this condition, the teeth 1122 engage the conduit 1107 by penetrating the outer surface 1109 of the conduit 1107. It should be noted that the outer surface 1109 of the conduit 1107 is free of grooves, flanges and beads, yet because of the engaging interaction of the teeth 1122 with the conduit 1107, the coupling 1100 securely retains the conduit 1107 within the coupling 1100.

It should be noted that, during insertion of the conduit 1107, the angled face 1160 of the support ring 1114 may contact and support the teeth 1122 to prevent the teeth 1122 from becoming disposed in a parallel condition relative to the outer surface 1109 of the conduit 1107. In such a parallel condition, the teeth 1122 may not penetrate the outer surface 1109 and engage the conduit 1107.

It should also be noted that as illustrated in FIG. 17, the O-ring 1116 engages or contacts the outer surface 1109 of the conduit 1107 such that there is a fluid-tight engagement between the O-ring 1116 and the conduit 1107. The contact of the first member 1110 and the second member 1118 with the conduit 1107 helps to maintain the conduit 1107 in an engaged position 1106 (as illustrated in FIG. 17) such that disruption of the fluid-tight engagement between the O-ring 1116 and the conduit 1107 is mitigated. In other words, the first member 1110 and second member 1118 mitigate twisting or rotation 1105 of the conduit 1107 relative to the coupling 1100 such that disruption of a fluid-tight engagement between the O-ring 1116 and the conduit 1107 is mitigated.

The conduit 1107 may be made from various types of metals or polymers, such as PVC. In addition, the conduit 1107 may be flexible or rigid.

Figure 18:
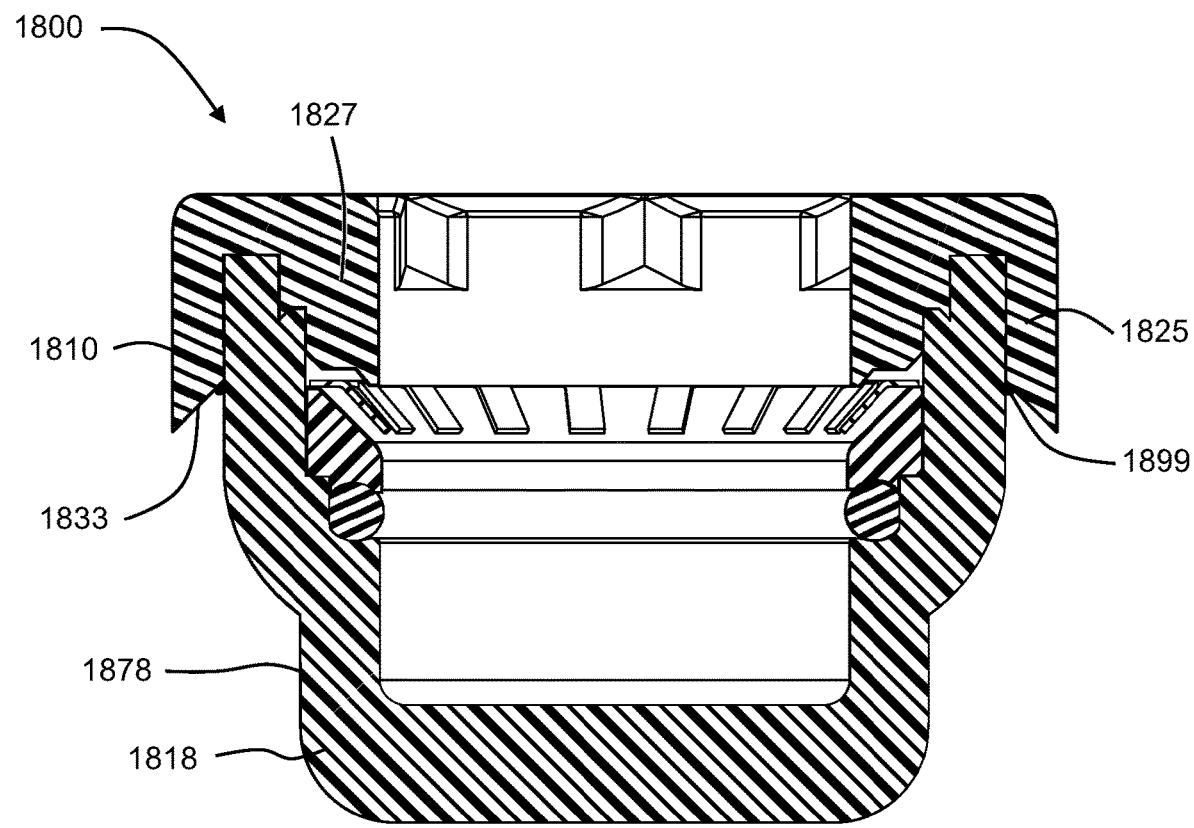
FIG. 18 is a cross-sectional view of yet another embodiment of a coupling.

FIG. 18 illustrates an alternative embodiment of the coupling 1800. This embodiment of the coupling 1800 is generally similar to or identical to the embodiment of the coupling 1100 discussed in connection with FIGS. 11-17 with the exception of the first member 1810 including both an exterior extension 1825 and an interior extension 1827. In the illustrated embodiment, the first member 1810 comprises both an interior extension 1827 and an exterior extension 1825. The interior extension 1827 is disposed within the second member 1818 while the exterior extension 1825 is disposed outside of the second member 1818 and abuts, is coupled to or is proximate to, the exterior surface 1878 of the second member 1818. The addition of the exterior extension 1825 may, in certain embodiments, enhance the engagement between the first member 1810 and the second member 1818. In one embodiment, the first member 1810 includes an exterior extension 1825 and omits an interior extension 1827.

In one embodiment, energy directors 1145 (shown in FIG. 12) may be positioned at various positions on both the interior extension 1827 and the exterior extension 1825 or on the second member 1818 such that both the interior extension 1827 and the exterior extension 1825 are securely welded (e.g., using either sonic or spin welded) to the second member 1818. As illustrated, the outer beveled edge 1833 of the exterior extension 1825 may accumulate flash deposits 1899 generated during the welding process.

Figure 19:
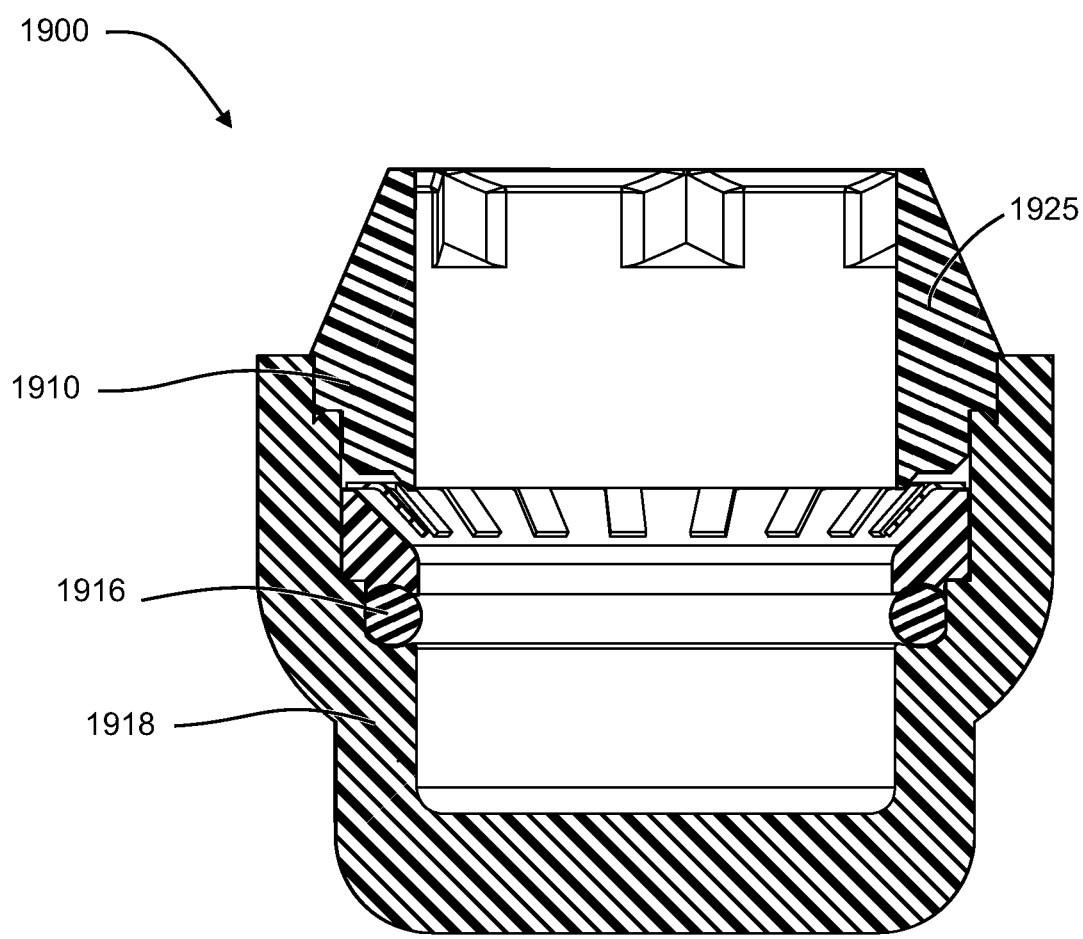
FIG. 19 is a cross-sectional view of yet another embodiment of a coupling.

FIG. 19 illustrates an alternative embodiment of the coupling 1900. This embodiment of the coupling 1900 is generally similar to or identical to the embodiment of the coupling 1100 discussed in connection with FIGS. 11-17 with the exception of the external extension 1925. As an exception, the first member 1910 includes an external extension 1925 that is disposed outside of the second member 1918 and extends away from the second member 1918. The external extension 1925 of the first member 1910 provides additional support to a conduit 1107 (shown in FIG. 17) disposed within the coupling 1900. This additional support mitigates the possibility of the conduit 1107 becoming disposed at an angle (i.e., twisted or rotated 1105 from the engaged position 1106 illustrated in FIG. 17) with respect to the coupling 1900 such that the fluid tight seal between the conduit 1107 and the coupling 1900 is disrupted, at least temporarily. The external extension 1925 may be configured in various ways. For example, the external extension 1925 may be tapered, as illustrated in FIG. 19, or have a generally rectangular shape.

Figure 20:
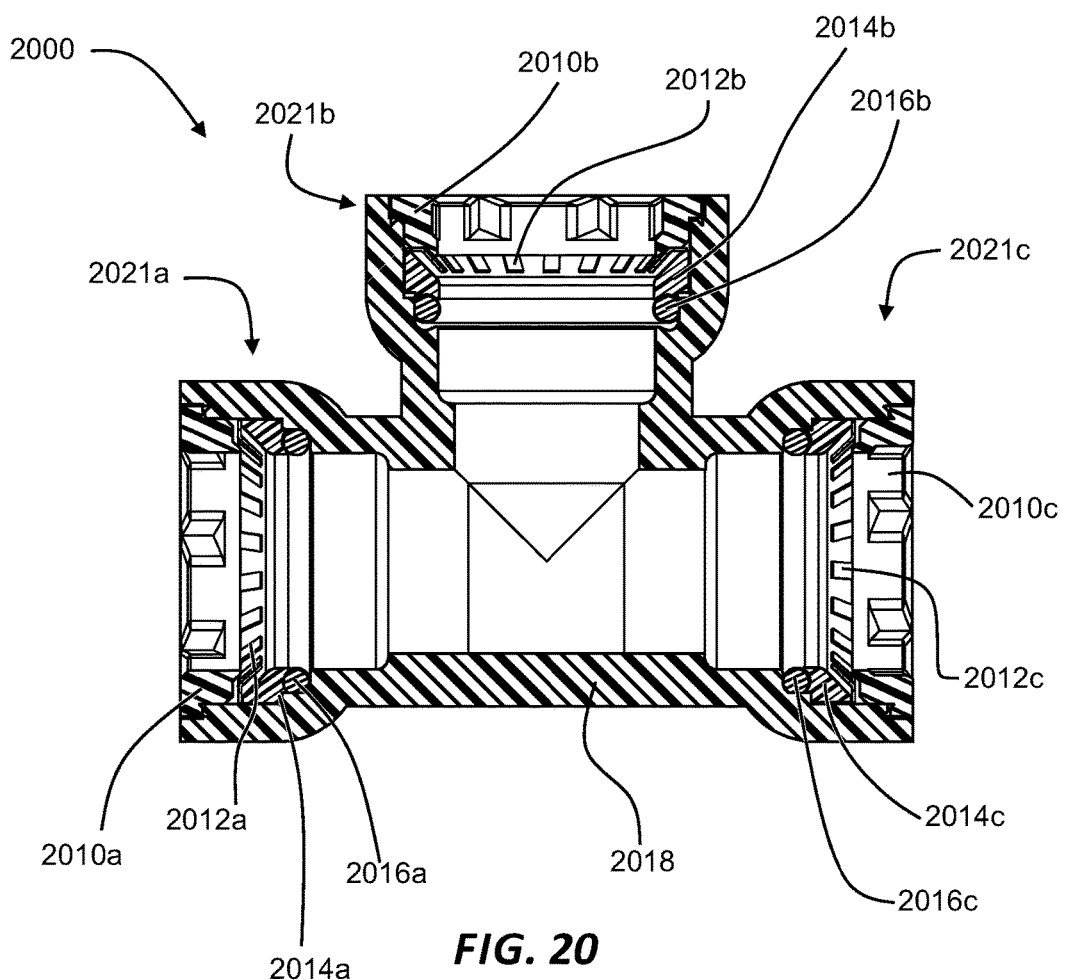
FIG. 20 is a cross-sectional view of yet another embodiment of a coupling.

FIG. 20 illustrates yet another alternative embodiment of a coupling 2000. This embodiment illustrates that the features and components disclosed previously herein may be utilized with a number of different types of couplings 20, 1100, 2000. For example, the coupling 1100 may be an end cap 1100, as illustrated in FIGS. 11-17. Alternatively, the coupling 2000 may be T-shaped, as shown in FIG. 20. In this embodiment, each conduit receiving end 2021a-c includes a first member 2010a-c, gripping ring 2012a-c, support ring 2014a-c, and O-ring 2016a-c. Accordingly, a conduit 1107 (shown in FIG. 17) may be disposed and secured within each conduit receiving end 2021a-c of the second member 2018. As illustrated, the first member 2010a-c is secured to the second member 2018 at each conduit receiving end 2021a-c using, by way of example only, a spin welding technique. Couplings that utilize the features and components described herein, for example, may comprise elbows at various angles, end caps, tees, double tees, and/or linear or curved adapters for receiving different size conduits at each end.

Figure 21:
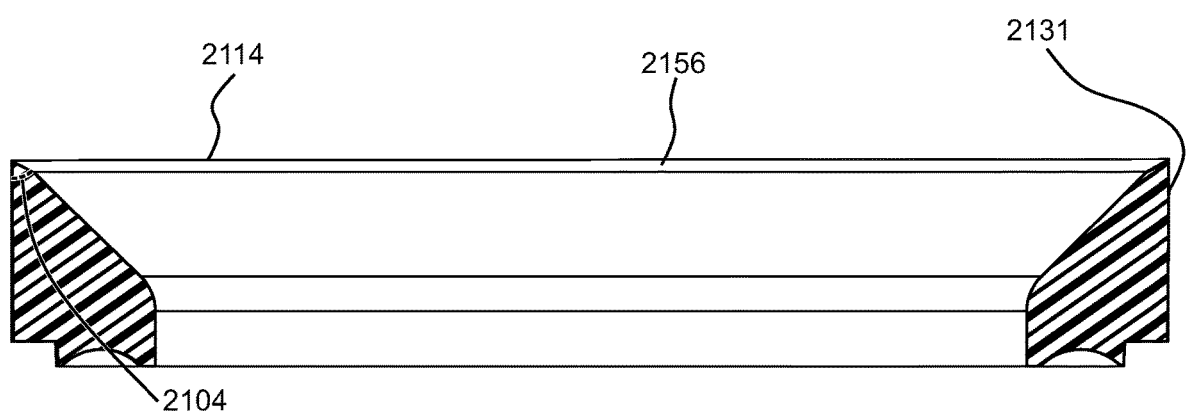
FIG. 21 is a cross-sectional view of one embodiment of a support ring for a coupling.
Figure 14:
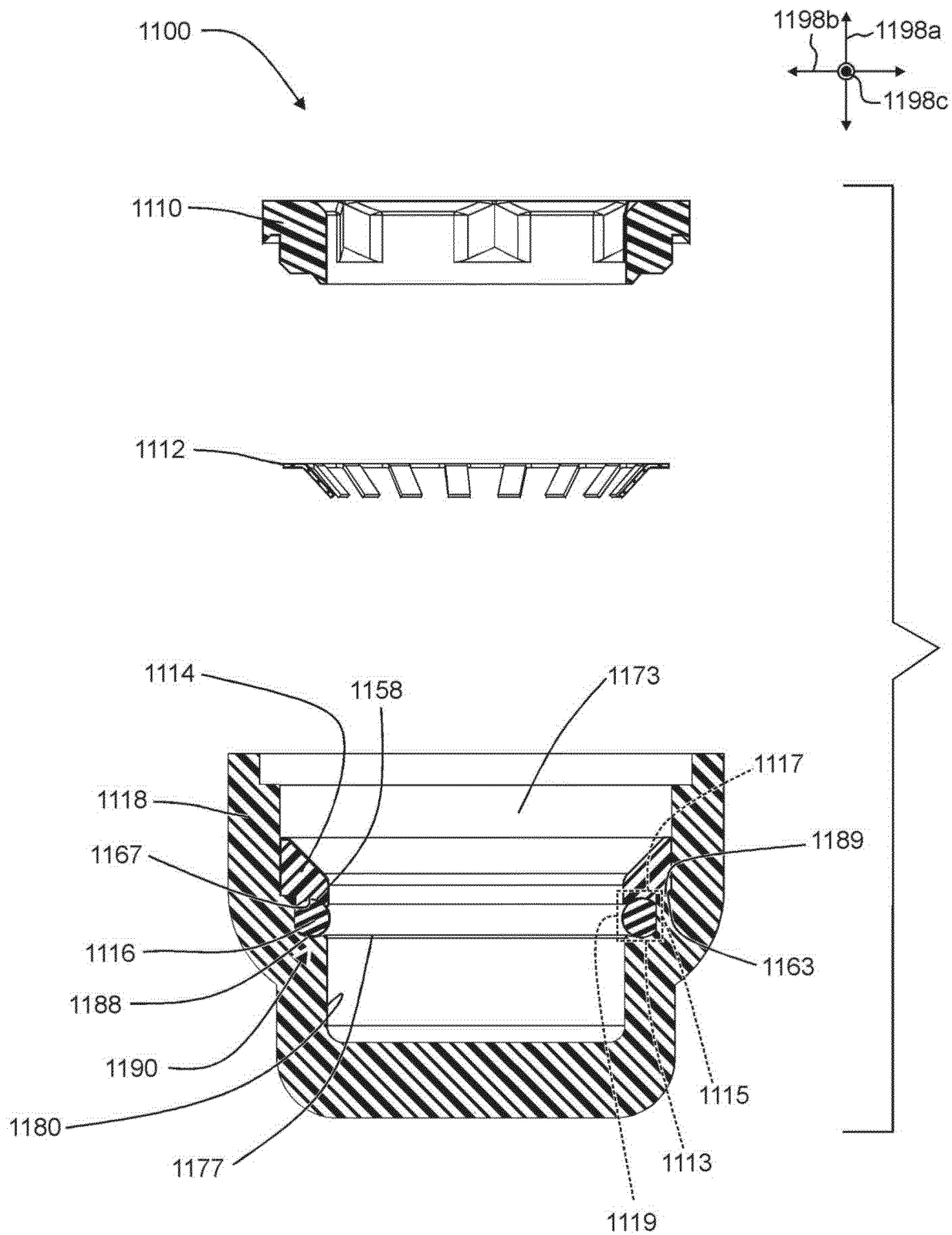

FIG. 21 illustrates an alternative embodiment of a support ring 2114. In this embodiment, the proximal face 2156 is disposed at an acute angle 2104 with respect to the exterior surface 2131 rather than being disposed at a 90° angle with respect to the exterior surface 2131. The angled proximal face 2156, as shown in FIG. 21, enables a support ring 2014 to more easily flex during insertion of the conduit 1107 into the coupling 2000. Accordingly, the insertion force required to position the conduit 1107 within the coupling 2000 is reduced, thereby reducing potential abrasion to the conduit 1107 and increasing the likelihood that the conduit 1107 will be properly inserted within the coupling 2000. It should be noted that the angled proximal face 2156 of a support ring 2114 may be used with a gripping ring 1112 (shown in FIG. 12) having a body width 1155 (also shown in FIG. 12) equal to, greater than, or less than the face width 1161 (also shown in FIG. 12) of the support ring 2114. It should further be noted that the proximal face 1156 of the support ring 1114 of FIG. 12 may be used with a gripping ring 1112 having a body width 1155 equal to, greater than, or less than the face width 1161 of the support ring 1114.

FIG. 22 comprises a table illustrating the burst or failure pressure in pounds per square inch (PSI) of 10 couplings (e.g., 1100) utilizing a sonic weld between the first member and the second member (e.g., 1110, 1118). As illustrated in FIG. 2, the average burst or failure pressure was 547.9 PSI.

FIG. 23 comprises a table illustrating the burst or failure pressure of 15 couplings (e.g., 1100) in which the first and second members (e.g., 1110, 1118) were secured to each other utilizing a spin weld technique. The 15 couplings referenced in FIG. 23 were of the same design as the 10 couplings referenced in FIG. 22 except that a spin weld was utilized in place of a sonic weld. The average burst pressure of these couplings was significantly improved, namely, the average burst pressure was 897.3 PSI. The results of these tests produced a surprising and unexpected result. The spin weld technique dramatically improved the performance of the couplings, increasing the average burst pressure by 349.4

PSI. This constitutes a 64% improvement over the sonic weld technique (349.4 PSI/547.9 PSI=0.6378). In various embodiments, the first and second members are each made from one or more types of plastics (e.g., polymers, monomers, ABS, polyvinyl chloride (PCV)) and the coupling has a burst pressure of at least, for example, 650, 700, 750, 800, 900, or 1000 PSI when the coupling (e.g., 1100) is coupled to a conduit (e.g., 1107) that is free of grooves, flanges and beads without the use of, for example, adhesives or threaded members to secure the coupling (e.g., 1100) to the conduit (e.g., 1107).

The disclosed subject matter may be embodied in other specific forms without departing from its structures, methods, or other essential characteristics as broadly described herein and claimed hereinafter. The described embodiments are to be considered in all respects only as illustrative, and not restrictive. For example, the release mechanism 42 may be utilized in connection with other embodiments, such as embodiments illustrated in FIGS. 11-20. Accordingly, features and components of disclosed embodiments may be used with other embodiments. In addition, the first and second members, gripping ring, support ring, and/or O-ring are illustrated as having a generally rounded outer shape. In an alternative embodiment, the first and second members, gripping ring, support ring, and/or O-ring may be, for example, square, octagonal or hexagonal in order to interface with a conduit having a corresponding shape. Further, the disclosed couplings may be used, for example, with both rigid and flexible types of conduits. The scope of the disclosed subject matter is, therefore, indicated by the appended claims, rather than by the foregoing description. All changes that come within the meaning and range of equivalency of the claims are to be embraced within their scope.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying methods claim the present elements of the various steps is a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein, but is to be accorded the widest scope consistent with the principles and novel features disclosed herein.

What is claimed is:

1. A coupling for attachment to a conduit having an insertion end, an outer surface of the insertion end of the conduit being smooth and free of grooves, flanges and beads, said coupling comprising: a first member having an exterior surface and an interior surface, the interior surface of the first member defining a first passageway through the first member, the first passageway extending from an entry end to a proximal end of the first member, wherein the exterior surface of the first member defines a first outer perimeter surface that is cylindrical in shape, a second outer perimeter surface that is cylindrical in shape and radially offset inwardly with respect to the first outer perimeter surface, and an energy director at least partially intermediate the first outer perimeter surface and the second outer perimeter surface; a second member having an exterior surface and an interior surface, the interior surface of the second member defining a second passageway through the second member, the second passageway extending from an attachment end to an opposite end of the second member, wherein the interior surface of the second member defines a first recessed region having a first width, and a second recessed region having a second width, the first width being greater than the second width, wherein the interior surface of the second member defines a first ledge intermediate the first recessed region and the second recessed region, wherein the first outer perimeter surface of the first member is in spin weld engagement with at least a portion of the interior surface of the second member defining the first recessed region, the energy director of the first member is in spin weld engagement with at least a portion of the first ledge of the second member, and the second outer perimeter surface of the first member is in spin weld engagement with at least a portion of the interior surface of the second member defining the second recessed region, wherein, prior to spin weld engagement with the at least a portion of the first ledge of the second member, the energy director comprises a curved extension with a radially inward disposed face, and following the spin weld engagement with the at least a portion of the first ledge of the second member, the energy director is fused with the at least a portion of the first ledge of the second member; the interior surface of the second member defining another ledge, the another ledge comprising a raised inner lip and a recessed outer portion, the raised inner lip being closer to the attachment end of the second member than the recessed outer portion, the recessed outer portion comprising an arcuate surface having an arcuate, side cross-sectional shape; a gripping ring having an inner edge defining a series of teeth, the gripping ring being disposed at least partially within the second recessed region; a support ring being disposed at least partially within the second recessed region; and an O-ring disposed intermediate the another ledge and the support ring, wherein each of the first and second members is made from one or more polymers, and wherein the coupling has a burst pressure of at least 700 pounds per square inch (PSI).

2. The coupling of claim 1, wherein a combination of the first and second members define a cavity for receiving flash weld deposits generated during creation of the spin weld engagement of the first member to the second member.

3. The coupling of claim 2, wherein at least a portion of the first member is disposed within the second recessed region.

4. The coupling of claim 1, wherein the gripping ring comprises an outer body having a body width and wherein a proximal face of the support ring further comprises a face width, wherein the face width is less than the body width.

5. The coupling of claim 4, wherein the face width is less than one-half of the body width.

6. The coupling of claim 4, wherein the face width is less than one-quarter of the body width.

7. The coupling of claim 4, wherein the face width is less than one-eighth of the body width.

8. The coupling of claim 1, wherein the exterior surface of the first member comprises a beveled edge extending radially inward from the second outer perimeter surface, the beveled edge extending away from the interior surface of the second member.

9. The coupling of claim 8, wherein the beveled edge is disposed within the second recessed region of the second member.

10. The coupling of claim 1, wherein the coupling has a burst pressure of at least 800 pounds per square inch (PSI).

11. A coupling for attachment to a conduit having an insertion end, an outer surface of the insertion end of the conduit being smooth and free of grooves, flanges and beads, said coupling comprising: a first member having an exterior surface and an interior surface, the interior surface of the first member defining a first passageway through the first member, the first passageway extending from an entry end to a proximal end of the first member, wherein the exterior surface of the first member defines a first outer perimeter surface that is cylindrical in shape, a second outer perimeter surface that is cylindrical in shape and radially offset inwardly with respect to the first outer perimeter surface, and an energy director at least partially intermediate the first outer perimeter surface and the second outer perimeter surface; a second member having an exterior surface and an interior surface, the interior surface of the second member defining a second passageway through the second member, the second passageway extending from an attachment end to an opposite end of the second member, wherein the interior surface of the second member defines a first recessed region having a first width, and a second recessed region having a second width, the first width being greater than the second width, wherein the interior surface of the second member defines a first ledge intermediate the first recessed region and the second recessed region, wherein the first outer perimeter surface of the first member is in spin weld engagement with at least a portion of the interior surface of the second member defining the first recessed region, the energy director of the first member is in spin weld engagement with at least a portion of the first ledge of the second member, and the second outer perimeter surface of the first member is in spin weld engagement with at least a portion of the interior surface of the second member defining the second recessed region, wherein, prior to spin weld engagement with the at least a portion of the first ledge of the second member, the energy director comprises a curved extension with a radially inward disposed face, and following the spin weld engagement with the at least a portion of the first ledge of the second member, the energy director is fused with the at least a portion of the first ledge of the second member; a gripping ring having an inner edge defining a series of teeth, the gripping ring being disposed at least partially within the second recessed region; a support ring being disposed at least partially within the second recessed region; and a seal disposed intermediate the another ledge and the support ring, wherein each of the first and second members is made from one or more polymers.

12. The coupling of claim 11, wherein the interior surface of the first member defines a plurality of tool receiving recesses.

13. The coupling of claim 11, wherein the gripping ring comprises an outer body having a body width and wherein a proximal face of the support ring further comprises a face width, wherein the face width is less than one-half of the body width.

14. The coupling of claim 13, wherein the face width is less than one-quarter of the body width.

15. The coupling of claim 13, wherein the face width is less than one-eighth of the body width.

16. The coupling of claim 11, wherein the exterior surface of the first member comprises a beveled edge adjacent to the second outer perimeter surface, the beveled edge extending inwardly away from the interior surface of the second member.

17. The coupling of claim 11, wherein the support ring comprises an inward ledged recess sized to mate with a ledge defined by the interior surface of the second member.

18. A method of manufacturing the coupling of claim 1, the method comprising: positioning the O-ring adjacent to the another ledge; positioning the support ring at least partially within the second recessed region of the second member adjacent to the O-ring; positioning the gripping ring adjacent to the support ring such that an outer body of the gripping ring abuts a proximal face of the support ring; and securing the first member to the second member utilizing a spin welding technique such that the first member securely retains the O-ring, the support ring, and the gripping ring within the second member.

19. The method of claim 18 further comprising: positioning at least a portion of the first member within the first recessed region and the second recessed region defined by the second member while the first member is secured to the second member utilizing the spin welding technique.

20. A coupling for attachment to a conduit having an insertion end, an outer surface of the insertion end of the conduit being smooth and free of grooves, flanges and beads, said coupling comprising: a first member having an exterior surface and an interior surface, the interior surface of the first member defining a first passageway through the first member, the first passageway extending from an entry end to a proximal end of the first member, wherein the exterior surface of the first member defines a first outer perimeter surface that is cylindrical in shape, a second outer perimeter surface that is cylindrical in shape and radially offset inwardly with respect to the first outer perimeter surface, and an energy director at least partially intermediate the first outer perimeter surface and the second outer perimeter surface; a second member coupled to the first member, the second member having an exterior surface and an interior surface, the interior surface of the second member defining a second passageway through the second member, the second passageway extending from an attachment end to an opposite end of the second member, wherein the interior surface of the second member defines a first recessed region having a first width, and second recessed region having a second width, the first width being greater than the second width, wherein the interior surface of the second member defines a first ledge intermediate the first recessed region and the second recessed region, wherein the first outer perimeter surface of the first member is in spin weld engagement with at least a portion of the interior surface of the second member defining the first recessed region, the energy director of the first member is in spin weld engagement with at least a portion of the first ledge of the second member, and the second outer perimeter surface of the first member is in spin weld engagement with at least a portion of the interior surface of the second member defining the second recessed region, wherein, prior to spin weld engagement with the at least a portion of the first ledge of the second member, the energy director comprises a curved extension with a radially inward disposed face, and following the spin weld engagement with the at least a portion of the first ledge of the second member, the energy director is fused with the at least a portion of the first ledge of the second member, the interior surface of the second member defining another ledge, the another ledge comprising a raised inner lip and a recessed outer portion, the raised inner lip being closer to the attachment end of the second member than the recessed outer portion, the recessed outer portion comprising an arcuate surface having an arcuate, side cross-sectional shape; a gripping ring having an inner edge defining a series of teeth, the gripping ring being disposed at least partially within the second recessed region; a support ring being disposed at least partially within the second recessed region; and a seal disposed intermediate the another ledge and the support ring, wherein each of the first and second members is made from one or more polymers.

\* \* \* \* \*

UNITED STATES PATENT AND TRADEMARK OFFICE
CERTIFICATE OF CORRECTION

| | |
|---|---|
| PATENT NO. | : 10,724,661 B2 |
| APPLICATION NO. | : 15/470728 |
| DATED | : July 28, 2020 |
| INVENTOR(S) | : Kent C. Ericksen et al. |

It is certified that error appears in the above-identified patent and that said Letters Patent is hereby corrected as shown below:

In the Drawings

Delete drawing sheet 14 and substitute the attached single sheet of drawings (sheet 14), which contains a single figure (Figure 14), to correct the drawings In the Specification In Column 1, Lines 43-44: Replace "such as conduit (e.g., "flexi-pipe") may be" with --, such as flexi-pipe, may be--
In Column 11, Line 23: Replace "of the body 108 along the" with --of the body 40 along the--
In Column 13, Line 39: Replace "toward the center 613 of the" with --toward the center 609 of the--
In Column 14, Line 4: Replace "defined by the recess" with --defined by a recess--
In Column 14, Lines 8-9: Replace "The J-shaped cross-shaped perimeter" with --The J-shaped cross-sectional perimeter--
In Column 16, Line 60: Replace "illustrates ribs 623 that may" with --illustrates ribs 627 that may--
In Column 16, Line 63: Replace "reference to FIG. 6-10, the coupling" with --reference to FIGS. 6-10, the coupling--
In Column 17, Lines 2-3: Replace "as illustrated FIG. 9;" with --as illustrated in FIG. 9;--
In Column 17, Lines 4-5: Replace "the circular 636 recess of the" with --the circular recess 636 of the--
In Column 17, Lines 12-13: Replace "third of the four quadrants 617 of the" with --third 617 of the four quadrants 613, 615, 617, 619 of the--
In Column 17, Line 47: Replace "series of tool recesses 1141 with" with --series of tool receiving recesses 1141 with--
In Column 17, Line 48: Replace "tool recess protrusions 1139." with --tool receiving protrusions 1139.--
In Column 20, Lines 66-67: Replace "illustrated at reference numeral 1196 in Figure 12)." with --illustrated at the arcuate surface 1196 in Figure 12).--
In Column 21, Line 35: Replace "ledged recess 1195 of the support" with --ledged recess 1163 of the support--

Signed and Sealed this
Sixth Day of February, 2024

*Katherine Kelly Vidal*
Katherine Kelly Vidal
*Director of the United States Patent and Trademark Office*